US010840981B2

(12) United States Patent
Li et al.

(10) Patent No.: US 10,840,981 B2
(45) Date of Patent: Nov. 17, 2020

(54) METHOD, BASE STATION, AND USER EQUIPMENT FOR REPORTING CHANNEL STATE INFORMATION

(71) Applicant: HUAWEI TECHNOLOGIES CO., LTD, Shenzhen (CN)

(72) Inventors: Xueru Li, Beijing (CN); Kunpeng Liu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/503,629

(22) Filed: Jul. 5, 2019

(65) Prior Publication Data
US 2019/0334596 A1 Oct. 31, 2019

Related U.S. Application Data

(63) Continuation of application No. PCT/CN2018/071548, filed on Jan. 5, 2018.

(30) Foreign Application Priority Data

Jan. 6, 2017 (CN) .......................... 2017 1 0010661

(51) Int. Cl.
H04B 7/0456 (2017.01)
H04B 7/06 (2006.01)

(52) U.S. Cl.
CPC ......... H04B 7/0482 (2013.01); H04B 7/0626 (2013.01); H04B 7/0634 (2013.01)

(58) Field of Classification Search
CPC .. H04B 7/0482; H04B 7/0626; H04B 7/0634; H04L 1/0026; H04L 1/0029
See application file for complete search history.

(56) References Cited

U.S. PATENT DOCUMENTS

2012/0327785 A1 12/2012 Zhang et al.
2015/0188614 A1 7/2015 Wang et al.

FOREIGN PATENT DOCUMENTS

CN 101674655 A 3/2010
CN 102104453 A 6/2011
(Continued)

OTHER PUBLICATIONS

National Instruments, Overview of Massive MIMO for NR. 3GPP TSG RAN WG1 Meeting #85 Nanjing, China, May 23-27, 2016, R1-164117, 8 pages.
(Continued)

Primary Examiner — Sophia Vlahos
(74) Attorney, Agent, or Firm — Kilpatrick Townsend & Stockton LLP

(57) ABSTRACT

The present invention provides a method for reporting channel state information. The method includes: receiving, by a base station, a first reference signal sent by user equipment; sending, by the base station, a first parameter set and a second reference signal to the user equipment, where the first parameter set is obtained by the base station by measuring the first reference signal; and receiving, by the base station, a third parameter set sent by the user equipment, where the third parameter set includes a relative value between a parameter in a second parameter set and a parameter in the first parameter set, the second parameter set is obtained by the user equipment by measuring the second reference signal, and the third parameter set and the first parameter set are used by the base station to determine a precoding matrix.

20 Claims, 7 Drawing Sheets

(56) References Cited

FOREIGN PATENT DOCUMENTS

| | | |
|---|---|---|
| CN | 102325013 A | 1/2012 |
| CN | 102332962 A | 1/2012 |
| CN | 103546262 A | 1/2014 |
| CN | 103812626 A | 5/2014 |
| CN | 104737482 A | 6/2015 |
| WO | 2008023930 A2 | 2/2008 |

OTHER PUBLICATIONS

Qualcomm Incorporated, Discussion on CSI acquisition. 3GPP TSG-RAN WG1 #86bis Oct. 10-14, 2016 Lisbon, Portugal, R1-1610149, 5 pages.

LG Electronics, Discussion on channel reciprocity for NR MIMO. 3GPP TSG RAN WG1 Meeting #87 Reno, USA Nov. 14-18, 2016, R1-1611826, 4 pages.

METHOD, BASE STATION, AND USER EQUIPMENT FOR REPORTING CHANNEL STATE INFORMATION

CROSS-REFERENCE TO RELATED APPLICATIONS

This application is a continuation of International Application No. PCT/CN2018/071548, filed on Jan. 5, 2018, which claims priority to Chinese Patent Application No. 201710010661.6, filed on Jan. 6, 2017, The disclosures of the aforementioned applications are hereby incorporated by reference in their entireties.

TECHNICAL FIELD

The present invention relates to the mobile communications field, and in particular, to a method, a base station, and user equipment (User Equipment, UE) for reporting channel state information (Channel State Information, CSI).

BACKGROUND

In a multi-antenna technology (Multiple Input Multiple Output, MIMO), a plurality of receive antennas and transmit antennas are used for communication, to improve a data transmission rate. However, a transmit end needs to obtain relatively accurate CSI, to perform processing such as precoding based on the CSI. For example, during downlink channel measurement, user equipment needs to feed back CSI to a base station. The CSI that is fed back includes a precoding matrix indicator (Precoding Matrix Indicator, PMI). The PMI is used to recommend a proper precoding matrix to the base station, so that the precoding matrix is used for precoding processing in subsequent data transmission. The PMI includes two parts: a PMI 1 and a PMI 2 that are respectively used to indicate a W1 codebook and a W2 codebook.

In a TDD (Time Division Duplex, time division duplex) system, when a quantity of transmit antennas and that of receive antennas of user equipment are inconsistent, the user equipment cannot perform complete reciprocity calibration. A base station sends a CSI-RS (Channel State Information-Reference Signal, channel state information-reference signal, also referred to as a sounding reference signal), and the user equipment measures the CSI-RS to obtain CSI of a downlink channel, and then directly feeds back a W1 codebook and a W2 codebook to the base station. Consequently, high CSI reporting overheads are caused. In an FDD (Frequency Division Duplex, frequency division duplex) system, a base station sends a CSI-RS, and user equipment measures the CSI-RS to obtain CSI of a downlink channel, and then feeds back a W1 codebook and a W2 codebook to the base station. Consequently, high CSI reporting overheads are caused.

In a carrier aggregation system, a base station and user equipment perform downlink communication by using a plurality of frequency bands at the same time. The base station separately sends CSI-RSs on the plurality of frequency bands, and the user equipment separately obtains downlink CSI on two frequency bands through measurement, and then separately feeds back a W1 codebook and a W2 codebook to the base station on the plurality of frequency bands. Consequently, high CSI reporting overheads are caused.

SUMMARY

According to a method, a base station, and user equipment for reporting channel state information that are provided in embodiments of the present invention, a difference between a CSI parameter measured by the user equipment and a CSI parameter measured by the base station may be reported without a need of reporting all CSI parameters measured by the user equipment, or a CSI parameter of a first frequency band and a relative value between a CSI parameter of at least one second frequency band and the CSI parameter of the first frequency band may be reported without a need of reporting all CSI parameters of the at least one second frequency band. In this way, a quantity of bits for quantizing a CSI parameter that needs to be reported can be significantly reduced, so as to reduce CSI reporting overheads, and improve a system throughput.

According to a first aspect, an embodiment of the present invention provides a method for reporting channel state information. The method includes: receiving, by a base station, a first reference signal sent by user equipment; sending, by the base station, a first parameter set and a second reference signal to the user equipment, where the first parameter set is obtained by the base station by measuring the first reference signal; and receiving, by the base station, a third parameter set sent by the user equipment, where the third parameter set includes a relative value between a parameter in a second parameter set and a parameter in the first parameter set, the second parameter set is obtained by the user equipment by measuring the second reference signal, and the third parameter set and the first parameter set are used by the base station to determine a precoding matrix.

In this embodiment of the present invention, the relative value between the parameter in the second parameter set and the parameter in the first parameter set may be reported. The base station may determine the precoding matrix by using the relative value and the first parameter set measured by the base station. A quantity of bits for quantizing the relative value is far less than a quantity of bits for quantizing the second parameter set. Therefore, CSI reporting overheads are reduced, and a system throughput is improved.

With reference to the first aspect, in a first possible implementation of the first aspect, the first parameter set includes parameters of uplink channels from n ports of the user equipment to the base station, and the second parameter set includes parameters of downlink channels from the base station to m ports of the user equipment, where the m ports include the n ports, and n and m are positive integers.

With reference to the first aspect, in a second possible implementation of the first aspect, the relative value between the parameter in the second parameter and the parameter in the first parameter includes one or more of a difference between, a ratio between, and a sum of the parameter in the second parameter and the parameter in the first parameter.

With reference to the first aspect, in a third possible implementation of the first aspect, the first parameter set includes a first base vector indicator set; the first base vector indicator set includes at least one first base vector indicator, and the at least one first base vector indicator is used to indicate at least one first base vector in a first base vector set; and the second parameter set includes a second base vector indicator set, the second base vector indicator set includes at least one second base vector indicator, and the at least one second base vector indicator is used to indicate at least one second base vector in a second base vector set.

With reference to the third possible implementation of the first aspect, in a fourth possible implementation of the first aspect, the third parameter set includes a relative value between the at least one second base vector indicator and the at least one first base vector indicator.

In this embodiment of the present invention, the relative value between the second base vector indicator and the first base vector indicator may be reported. The base station may correct, by using the relative value, the first base vector indicator measured by the base station, to obtain the second base vector indicator. A quantity of bits for quantizing the relative value is far less than a quantity of bits for quantizing the second base vector indicator. Therefore, CSI reporting overheads are reduced, and a system throughput is improved.

With reference to the third possible implementation of the first aspect, in a fifth possible implementation of the first aspect, the third parameter set includes a relative value between second base vector amplitude information and first base vector amplitude information, where the first base vector amplitude information is amplitude information of the at least one first base vector, the second base vector amplitude information is amplitude information of the at least one second base vector, and the second base vector amplitude information is obtained by the user equipment based on the second reference signal and the first parameter.

In this embodiment of the present invention, the relative value between the second base vector amplitude information and the first base vector amplitude information may be reported. The base station may correct, by using the relative value, the first base vector amplitude information measured by the base station, to obtain the second base vector amplitude information. A quantity of bits for quantizing the relative value is far less than a quantity of bits for quantizing the second base vector amplitude information. Therefore, CSI reporting overheads are reduced, and a system throughput is improved.

With reference to the third possible implementation of the first aspect, in a sixth possible implementation of the first aspect, the third parameter set includes a relative value between a second base vector combination coefficient phase and a first base vector combination coefficient phase, the first base vector combination coefficient phase is a combination coefficient phase of the at least one first base vector, and the second base vector combination phase is a combination coefficient phase of the at least one second base vector; and the first base vector combination coefficient phase is obtained by the user equipment based on the second reference signal and a parameter in the first parameter set.

In this embodiment of the present invention, the relative value between the second base vector combination coefficient phase and the first base vector combination coefficient phase may be reported. The base station may correct, by using the relative value, the first base vector combination coefficient phase measured by the base station, to obtain the second base vector combination coefficient phase. A quantity of bits for quantizing the relative value is far less than a quantity of bits for quantizing the second base vector combination coefficient phase. Therefore, CSI reporting overheads are reduced, and a system throughput is improved.

With reference to the first aspect, in a seventh possible implementation of the first aspect, the first reference signal includes a sounding reference signal SRS.

With reference to the first aspect, in an eighth possible implementation of the first aspect, the second reference signal includes a channel state information-reference signal CSI-RS.

With reference to any one of the first aspect or the first to the eighth possible implementations of the first aspect, in a ninth possible implementation of the first aspect, that the third parameter set and the first parameter set are used to determine a precoding matrix includes: the third parameter set is used by the base station to correct the first parameter set, to obtain the second parameter set; and the precoding matrix is determined based on the second parameter set.

With reference to the first aspect, in a tenth possible implementation of the first aspect, the third parameter set further includes a parameter in the second parameter set.

According to a second aspect, an embodiment of the present invention further provides a method for reporting channel state information. The method includes: sending, by user equipment, a first reference signal to a base station; receiving, by the user equipment, a first parameter and a second reference signal that are sent by the base station, where the first parameter set is obtained by the base station by measuring the first reference signal; and sending, by the user equipment, a third parameter set to the base station, where the third parameter set includes a relative value between a parameter in a second parameter set and a parameter in the first parameter set, the second parameter set is obtained by the user equipment by measuring the second reference signal, and the third parameter set and the first parameter set are used by the base station to determine a precoding matrix.

In this embodiment of the present invention, the relative value between the parameter in the second parameter set and the parameter in the first parameter set may be reported. The base station may determine the precoding matrix by using the relative value and the first parameter set measured by the base station. A quantity of bits for quantizing the relative value is far less than a quantity of bits for quantizing the second parameter set. Therefore, CSI reporting overheads are reduced, and a system throughput is improved.

With reference to the second aspect, in a first possible implementation of the second aspect, the first parameter set includes parameters of uplink channels from n ports of the user equipment to the base station, and the second parameter set includes parameters of downlink channels from the base station to m ports of the user equipment, where the m ports include the n ports, and n and m are positive integers.

With reference to the second aspect, in a second possible implementation of the second aspect, the relative value between the parameter in the second parameter and the parameter in the first parameter includes one or more of a difference between, a ratio between, and a sum of the parameter in the second parameter and the parameter in the first parameter.

With reference to the second aspect, in a third possible implementation of the second aspect, the first parameter set includes a first base vector indicator set; the first base vector indicator set includes at least one first base vector indicator, and the at least one first base vector indicator is used to indicate at least one first base vector in a first base vector set; and the second parameter set includes a second base vector indicator set, the second base vector indicator set includes at least one second base vector indicator, and the at least one second base vector indicator is used to indicate at least one second base vector in a second base vector set.

With reference to the third possible implementation of the second aspect, in a fourth possible implementation of the second aspect, the third parameter set includes a relative value between the at least one second base vector indicator and the at least one first base vector indicator.

In this embodiment of the present invention, the relative value between the second base vector indicator and the first base vector indicator may be reported. The base station may correct, by using the relative value, the first base vector indicator measured by the base station, to obtain the second base vector indicator. A quantity of bits for quantizing the relative value is far less than a quantity of bits for quantizing the second base vector indicator. Therefore, CSI reporting overheads are reduced, and a system throughput is improved.

With reference to the third possible implementation of the second aspect, in a fifth possible implementation of the second aspect, the third parameter set includes a relative value between second base vector amplitude information and first base vector amplitude information, where the first base vector amplitude information is amplitude information of the at least one first base vector, the second base vector amplitude information is amplitude information of the at least one second base vector, and the second base vector amplitude information is obtained by the user equipment based on the second reference signal and the first parameter.

In this embodiment of the present invention, the relative value between the second base vector amplitude information and the first base vector amplitude information may be reported. The base station may correct, by using the relative value, the first base vector amplitude information measured by the base station, to obtain the second base vector amplitude information. A quantity of bits for quantizing the relative value is far less than a quantity of bits for quantizing the second base vector amplitude information. Therefore, CSI reporting overheads are reduced, and a system throughput is improved.

With reference to the third possible implementation of the second aspect, in a sixth possible implementation of the second aspect, the third parameter set includes a relative value between a second base vector combination coefficient phase and a first base vector combination coefficient phase, the first base vector combination coefficient phase is a combination coefficient phase of the at least one first base vector, and the second base vector combination phase is a combination coefficient phase of the at least one second base vector; and the first base vector combination coefficient phase is obtained by the user equipment based on the second reference signal and the first parameter set.

In this embodiment of the present invention, the relative value between the second base vector combination coefficient phase and the first base vector combination coefficient phase may be reported. The base station may correct, by using the relative value, the first base vector combination coefficient phase measured by the base station, to obtain the second base vector combination coefficient phase. A quantity of bits for quantizing the relative value is far less than a quantity of bits for quantizing the second base vector combination coefficient phase. Therefore, CSI reporting overheads are reduced, and a system throughput is improved.

With reference to the second aspect, in a seventh possible implementation of the second aspect, the first reference signal includes a sounding reference signal SRS.

With reference to the second aspect, in an eighth possible implementation of the second aspect, the second reference signal includes a channel state information-reference signal CSI-RS.

With reference to any one of the second aspect or the first to the eighth possible implementations of the second aspect, in a ninth possible implementation of the second aspect, that the third parameter set and the first parameter set are used by the base station to determine a precoding matrix includes: the third parameter set is used by the base station to correct the first parameter set, to obtain the second parameter set; and the precoding matrix is determined based on the second parameter set.

With reference to the second aspect, in a tenth possible implementation of the second aspect, the third parameter set further includes a parameter in the second parameter set.

According to a third aspect, an embodiment of the present invention further provides a method for reporting channel state information. The method includes: sending, by a base station, a first reference signal and at least one second reference signal to user equipment; and receiving, by the base station, a first parameter set and a third parameter set that are sent by the user equipment, where the first parameter set is obtained by the user equipment by measuring the first reference signal, the third parameter set includes a relative value between a parameter in at least one second parameter set and a parameter in the first parameter set, the at least one second parameter set is obtained by the user equipment by measuring the at least one second reference signal, and the third parameter set and the first parameter set are used by the base station to determine a precoding matrix.

In this embodiment of the present invention, the first parameter set and the relative value between the parameter in the second parameter set and the parameter in the first parameter set may be reported. The base station may correct the parameter in the first parameter set by using the relative value, to obtain the second parameter set. A quantity of bits for quantizing the relative value is far less than a quantity of bits for quantizing the second parameter set. Therefore, CSI reporting overheads are reduced, and a system throughput is improved.

With reference to the third aspect, in a first possible implementation of the third aspect, the relative value between the parameter in the at least one second parameter and the parameter in the first parameter includes one or more of a difference between, a ratio between, and a sum of the parameter in the at least one second parameter and the parameter in the first parameter.

With reference to the third aspect, in a second possible implementation of the third aspect, the first parameter set includes a first base vector indicator set; the first base vector indicator set includes at least one first base vector indicator, and the at least one first base vector indicator is used to indicate at least one first base vector in a first base vector set; and the at least one second parameter set includes a second base vector indicator set, the second base vector indicator set includes at least one second base vector indicator, and the at least one second base vector indicator is used to indicate at least one second base vector in a second base vector set.

With reference to the second possible implementation of the third aspect, in a third possible implementation of the third aspect, the third parameter set includes a relative value between the at least one second base vector indicator and the at least one first base vector indicator.

In this embodiment of the present invention, the first base vector indicator set and the relative value between the second base vector indicator and the first base vector indicator may be reported. The base station may correct an indicator in the first base vector indicator set by using the relative value, to obtain the second base vector indicator set. A quantity of bits for quantizing the relative value is far less than a quantity of bits for quantizing the second base vector indicator set. Therefore, CSI reporting overheads are reduced, and a system throughput is improved.

With reference to the second possible implementation of the third aspect, in a fourth possible implementation of the third aspect, the third parameter set includes a relative value between second base vector amplitude information and first base vector amplitude information, where the first base vector amplitude information is amplitude information of the at least one first base vector, and the second base vector amplitude information is amplitude information of the at least one second base vector.

In this embodiment of the present invention, the first base vector amplitude information and the relative value between the second base vector amplitude information and the first base vector amplitude information may be reported. The base station may correct the first base vector amplitude information by using the relative value, to obtain the second base vector amplitude information. A quantity of bits for quantizing the relative value is far less than a quantity of bits for quantizing the second base vector amplitude information. Therefore, CSI reporting overheads are reduced, and a system throughput is improved.

With reference to the third aspect, in a fifth possible implementation of the third aspect, the first reference signal includes a channel state information-reference signal CSI-RS of a first frequency band, and the at least one second reference signal includes a channel state information-reference signal CSI-RS of at least one second frequency band.

According to a fourth aspect, an embodiment of the present invention further provides a method for reporting channel state information. The method includes: receiving, by user equipment, a first reference signal and at least one second reference signal that are sent by a base station; and sending, by the user equipment, a first parameter set and a third parameter set to the base station, where the first parameter set is obtained by the user equipment by measuring the first reference signal, the third parameter set includes a relative value between a parameter in at least one second parameter set and a parameter in the first parameter set, the at least one second parameter set is obtained by the user equipment by measuring the at least one second reference signal, and the third parameter set and the first parameter set are used by the base station to determine a precoding matrix.

In this embodiment of the present invention, the first parameter set and the relative value between the parameter in the second parameter set and the parameter in the first parameter set may be reported. The base station may correct the parameter in the first parameter set by using the relative value, to obtain the second parameter set. A quantity of bits for quantizing the relative value is far less than a quantity of bits for quantizing the second parameter set. Therefore, CSI reporting overheads are reduced, and a system throughput is improved.

With reference to the fourth aspect, in a first possible implementation of the fourth aspect, the relative value between the parameter in the at least one second parameter and the parameter in the first parameter includes one or more of a difference between, a ratio between, and a sum of the parameter in the at least one second parameter and the parameter in the first parameter.

With reference to the fourth aspect, in a second possible implementation of the fourth aspect, the first parameter set includes a first base vector indicator set; the first base vector indicator set includes at least one first base vector indicator, and the at least one first base vector indicator is used to indicate at least one first base vector in a first base vector set; and the at least one second parameter set includes a second base vector indicator set, the second base vector indicator set includes at least one second base vector indicator, and the at least one second base vector indicator is used to indicate at least one second base vector in a second base vector set.

With reference to the second possible implementation of the fourth aspect, in a third possible implementation of the fourth aspect, the third parameter set includes a relative value between the at least one second base vector indicator and the at least one first base vector indicator.

In this embodiment of the present invention, the first vector indicator set and the relative value between the second base vector indicator and the first base vector indicator may be reported. The base station may correct an indicator in the first base vector indicator set by using the relative value, to obtain the second base vector indicator set. A quantity of bits for quantizing the relative value is far less than a quantity of bits for quantizing the second base vector indicator set. Therefore, CSI reporting overheads are reduced, and a system throughput is improved.

With reference to the second possible implementation of the fourth aspect, in a fourth possible implementation of the fourth aspect, the third parameter set includes a relative value between second base vector amplitude information and first base vector amplitude information, where the first base vector amplitude information is amplitude information of the at least one first base vector, and the second base vector amplitude information is amplitude information of the at least one second base vector.

In this embodiment of the present invention, the first base vector amplitude information and the relative value between the second base vector amplitude information and the first base vector amplitude information may be reported. The base station may correct the first base vector amplitude information by using the relative value, to obtain the second base vector amplitude information. A quantity of bits for quantizing the relative value is far less than a quantity of bits for quantizing the second base vector amplitude information. Therefore, CSI reporting overheads are reduced, and a system throughput is improved.

With reference to the fourth aspect, in a fifth possible implementation of the fourth aspect, the first reference signal includes a channel state information-reference signal CSI-RS of a first frequency band, and the at least one second reference signal includes a channel state information-reference signal CSI-RS of at least one second frequency band.

According to a fifth aspect, an embodiment of the present invention provides a base station for reporting channel state information. The base station includes: a receiving module, configured to receive a first reference signal sent by user equipment; and a sending module and a processing module, where the sending module is configured to send a first parameter set and a second reference signal to the user equipment, where the first parameter set is obtained by the processing module by measuring the first reference signal; where the receiving module is further configured to receive a third parameter set sent by the user equipment, where the third parameter set includes a relative value between a parameter in a second parameter set and a parameter in the first parameter set, the second parameter set is obtained by the user equipment by measuring the second reference signal, and the third parameter set and the first parameter set are used by the processing module to determine a precoding matrix.

According to a sixth aspect, an embodiment of the present invention provides user equipment for reporting channel state information. The user equipment includes: a sending module, configured to send a first reference signal to a base station; a receiving module, configured to receive a first parameter and a second reference signal that are sent by the base station, where the first parameter set is obtained by the base station by measuring the first reference signal; where the sending module is further configured to send a third parameter set to the base station, where the third parameter set includes a relative value between a parameter in a second parameter set and a parameter in the first parameter set; and a processing module, where the second parameter set is obtained by the processing module by measuring the second reference signal, and the third parameter set and the first parameter set are used by the base station to determine a precoding matrix.

According to a seventh aspect, an embodiment of the present invention provides another base station for reporting channel state information. The base station includes: a sending module, configured to send a first reference signal and at least one second reference signal to user equipment; a receiving module, configured to receive a first parameter set and a third parameter set that are sent by the user equipment, where the first parameter set is obtained by the user equipment by measuring the first reference signal, the third parameter set includes a relative value between a parameter in at least one second parameter set and a parameter in the first parameter set, and the at least one second parameter set is obtained by the user equipment by measuring the at least one second reference signal; and a processing module, where the third parameter set and the first parameter set are used by the processing module to determine a precoding matrix.

According to an eighth aspect, an embodiment of the present invention provides another user equipment for reporting channel state information. The user equipment includes: a receiving module, configured to receive a first reference signal and at least one second reference signal that are sent by a base station; and a sending module and a processing module, where the sending module is configured to send a first parameter set and a third parameter set to the base station, where the first parameter set is obtained by the processing module by measuring the first reference signal, the third parameter set includes a relative value between a parameter in at least one second parameter set and a parameter in the first parameter set, the at least one second parameter set is obtained by the processing module by measuring the at least one second reference signal, and the third parameter set and the first parameter set are used by the base station to determine a precoding matrix.

According to a ninth aspect, an embodiment of the present invention provides a base station for reporting channel state information. The base station includes a radio frequency circuit and a processor, where the radio frequency circuit is configured to receive a first reference signal sent by user equipment; the radio frequency circuit is further configured to send a first parameter set and a second reference signal to the user equipment, where the first parameter set is obtained by the processor by measuring the first reference signal; and the radio frequency circuit is further configured to receive a third parameter set sent by the user equipment, where the third parameter set includes a relative value between a parameter in a second parameter set and a parameter in the first parameter set, the second parameter set is obtained by the user equipment by measuring the second reference signal, and the third parameter set and the first parameter set are used by the processor to determine a precoding matrix.

According to a tenth aspect, an embodiment of the present invention provides user equipment for reporting channel state information. The user equipment includes a radio frequency circuit and a processor, where the radio frequency circuit is configured to send a first reference signal to a base station; the radio frequency circuit is further configured to receive a first parameter and a second reference signal that are sent by the base station, where the first parameter set is obtained by the base station by measuring the first reference signal; and the radio frequency circuit is further configured to send a third parameter set to the base station, where the third parameter set includes a relative value between a parameter in a second parameter set and a parameter in the first parameter set, the second parameter set is obtained by the processor by measuring the second reference signal, and the third parameter set and the first parameter set are used by the base station to determine a precoding matrix.

According to an eleventh aspect, an embodiment of the present invention provides another base station for reporting channel state information. The base station includes a radio frequency circuit and a processor, where the radio frequency circuit is configured to send a first reference signal and at least one second reference signal to user equipment; the radio frequency circuit is further configured to receive a first parameter set and a third parameter set that are sent by the user equipment, where the first parameter set is obtained by the user equipment by measuring the first reference signal, the third parameter set includes a relative value between a parameter in at least one second parameter set and a parameter in the first parameter set, the at least one second parameter set is obtained by the user equipment by measuring the at least one second reference signal, and the third parameter set and the first parameter set are used by the processor to determine a precoding matrix.

According to a twelfth aspect, an embodiment of the present invention provides another user equipment for reporting channel state information. The user equipment includes a radio frequency circuit and a processor, where the radio frequency circuit is configured to receive a first reference signal and at least one second reference signal that are sent by a base station; the radio frequency circuit is further configured to send a first parameter set and a third parameter set to the base station, where the first parameter set is obtained by the processor by measuring the first reference signal, the third parameter set includes a relative value between a parameter in at least one second parameter set and a parameter in the first parameter set, the at least one second parameter set is obtained by the processor by measuring the at least one second reference signal, and the third parameter set and the first parameter set are used by the base station to determine a precoding matrix.

According to a thirteenth aspect, an embodiment of the present invention provides a computer readable storage medium, where the computer readable storage medium includes a computer readable instruction, and when a computer reads and executes the computer readable instruction, the computer performs the foregoing method for reporting channel state information.

According to a fourteenth aspect, an embodiment of the present invention provides a computer program product, where the computer program product includes a computer readable instruction, and when a computer reads and executes the computer readable instruction, the computer performs the foregoing method for reporting channel state information.

According to the method for reporting channel state information, the base station, and the user equipment provided in the embodiments of the present invention, a difference between a CSI parameter measured by the user equipment and a CSI parameter measured by the base station may be reported without a need of reporting all CSI parameters measured by the user equipment, or a CSI parameter of the first frequency band and a relative value between a CSI parameter of the at least one second frequency band and the CSI parameter of the first frequency band may be reported without a need of reporting all CSI parameters of the at least one second frequency band. In this way, a quantity of bits for quantizing a CSI parameter that needs to be reported can be significantly reduced, so as to reduce CSI reporting overheads, and improve a system throughput.

DESCRIPTION OF EMBODIMENTS

The following describes technical solutions in embodiments of the present invention with reference to accompanying drawings. Apparently, the described embodiments are some rather than all of the embodiments of the present invention.

A base station in the embodiments of this application includes but is not limited to a NodeB NodeB, an evolved NodeB eNodeB, a base station in a fifth-generation (the fifth generation, 5G) communications system, a base station in a future communications system, or the like. User equipment in the embodiments of this application includes but is not limited to a mobile phone (mobile phone), a tablet computer (Pad), a computer having a wireless receiving and sending function, a virtual reality (Virtual Reality, VR) terminal device, an augmented reality (Augmented Reality, AR) terminal device, a wireless terminal in industrial control (industrial control), a wireless terminal in self driving (self driving), a wireless terminal in telemedicine (remote medical), a wireless terminal in smart grid (smart grid), a wireless terminal in transportation safety (transportation safety), a wireless terminal in smart city (smart city), a wireless terminal in smart home (smart home), or the like. An application scenario is not limited in the embodiments of this application.

It should be noted that in the embodiments of this application, a transmit antenna is an antenna able to be used for data receiving and sending, and a receive antenna is an antenna able to be used for data receiving. The receive antenna may include an antenna used for data receiving and sending; in other words, the receive antenna includes the transmit antenna. A downlink is a link on which a base station sends information to user equipment, and an uplink is a link on which the user equipment sends information to the base station.

In a wireless communications system, a PMI is used to recommend a proper precoding matrix to a base station, so that the base station performs precoding processing for data transmission. The PMI includes two parts: a PMI 1 and a PMI 2 that are respectively used to indicate a W1 codebook and a W2 codebook. The W1 codebook is used to select a proper base vector. The base vector represents signal space of a downlink channel, and may reflect a value range of an angle of departure of the downlink channel on a base station side. The W2 codebook includes an amplitude and a phase of the channel on a selected base vector.

Figure 1:
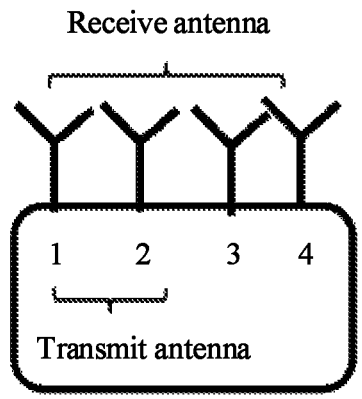
FIG. 1 is a schematic structural diagram of an antenna of user equipment according to an embodiment of the present invention.

In a TDD system, as shown in FIG. 1, user equipment usually has N1 transmit antennas and N2 receive antennas, where N1 and N2 are positive integers, and N2>N1. The transmit antennas may be specifically an antenna 1 and an antenna 2 shown in FIG. 1, and the receive antennas may be specifically the antenna 1, the antenna 2, an antenna 3, and an antenna 4 shown in FIG. 1. A base station may measure a CSI parameter between a transmit antenna of the user equipment and the base station based on an (Sounding Reference Signal, sounding reference signal, also referred to as a channel reference signal) SRS, and may send the CSI parameter to the user equipment. The user equipment may perform measurement based on a CSI-RS sent by the base station, to determine a CSI parameter between the base station and a receive antenna of the user equipment. In the TDD system, an uplink channel and a downlink channel are reciprocal, and channels between the antennas of the user equipment and the base station are closely correlated. Therefore, the user equipment may report a relative value between the CSI parameter measured by the user equipment and the received CSI parameter measured by the base station. The base station may determine a channel state between the base station and the receive antenna of the user equipment based on the relative value that is reported by the user equipment and that is between the CSI parameter measured by the user equipment and the CSI parameter measured by the base station, so as to determine a precoding matrix for subsequent data transmission, thereby improving data transmission performance. In the embodiments of the present invention, because the feature that the channels between the antennas of the user equipment and the base station are closely correlated is used, the user equipment may report only the relative value between the CSI parameter measured by the user equipment and the received CSI parameter measured by the base station, and does not need to report all CSI parameters measured by the user equipment. In this way, a quantity of bits for quantizing a CSI parameter that needs to be reported can be significantly reduced, so as to reduce CSI reporting overheads, and improve a system throughput.

In an FDD system, user equipment and a base station perform uplink communication by using a first frequency band (whose frequency range is $f_L$-$f_H$ Hz), and performs downlink transmission by using a second frequency band (whose frequency range is $g_L$-$g_H$ Hz). The frequency range of the first frequency band and that of the second frequency band do not overlap, and there is a specific interval between the first frequency band and the second frequency band. When the interval between the first frequency band and the second frequency band falls within a specific range, channels between the base station and the user equipment on the two frequency bands are closely correlated. As shown in FIG. 1, the user equipment usually has N1 transmit antennas and N2 receive antennas, where N1 and N2 are positive integers, and N2>N1. The transmit antennas may be specifically an antenna 1 and an antenna 2 shown in FIG. 1, and the receive antennas may be specifically the antenna 1, the antenna 2, an antenna 3, and an antenna 4 shown in FIG. 1. A base station may measure a CSI parameter, on the first frequency band, between a transmit antenna of the user equipment and the base station based on an SRS, and may send the CSI parameter to the user equipment. The user equipment may perform measurement based on a CSI-RS sent by the base station, to determine a CSI parameter between the base station and a receive antenna of the user equipment. In the FDD system, when the interval between the first frequency band and the second frequency band falls within the specific range, the channels between the base station and the user equipment on the two frequency bands are closely correlated. Therefore, the user equipment may report a relative value between the CSI parameter measured by the user equipment and the received CSI parameter measured by the base station. The base station may determine a channel state between the base station and the receive antenna of the user equipment based on the relative value that is reported by the user equipment and that is between the CSI parameter measured by the user equipment and the CSI parameter measured by the base station, so as to determine a precoding matrix for subsequent data transmission, thereby improving data transmission performance. In the embodiments of the present invention, because the user equipment uses the feature that the channels between the base station and the user equipment on the two frequency bands are closely correlated, the user equipment may report only the relative value between the CSI parameter measured by the user equipment and the received CSI parameter measured by the base station, and does not need to report all CSI parameters measured by the user equipment. In this way, a quantity of bits for quantizing a CSI parameter that needs to be reported can be significantly reduced, so as to reduce CSI reporting overheads, and improve a system throughput.

In a carrier aggregation system, user equipment and a base station perform downlink communication by using both a first frequency band (whose frequency range is $f_L$-$f_H$ Hz) and at least one second frequency band (whose frequency range is $g_L$-$g_H$ Hz). The frequency range of the first frequency band and that of the at least one second frequency band do not overlap, and there is a specific interval between the first frequency band and the at least one second frequency band. When the interval between the first frequency band and the at least one second frequency band falls within a specific range, channels between the base station and the user equipment on the first frequency band and the at least one second frequency band are closely correlated. The user equipment may perform measurement based on CSI-RSs sent by the base station separately on the first frequency band and the at least one second frequency band, to determine CSI parameters of the first frequency band and the at least one second frequency band between the base station and a receive antenna of the user equipment. When the interval between the first frequency band and the at least one second frequency band falls within the specific range, the channels between the base station and the user equipment on the first frequency band and the at least one second frequency band are closely correlated. Therefore, the user equipment may report a CSI parameter of the first frequency band and a relative value between a CSI parameter of the at least one second frequency band and the CSI parameter of the first frequency band to the base station. The base station may determine a channel state of the at least one second frequency band based on the CSI parameter of the first frequency band and the relative value between the CSI parameter of the at least one second frequency band and the CSI parameter of the first frequency band, so as to determine a precoding matrix for subsequent data transmission, thereby improving data transmission performance. In the embodiments of the present invention, because the user equipment uses the feature that the channels between the base station and the user equipment on the first frequency band and the at least one second frequency band are closely correlated, the user equipment may report only the CSI parameter of the first frequency band and the relative value between the CSI parameter of the at least one second frequency band and the CSI parameter of the first frequency band, and does not need to report all CSI parameters of the at least one second frequency band. In this way, a quantity of bits for quantizing a CSI parameter that needs to be reported can be significantly reduced, so as to reduce CSI reporting overheads, and improve a system throughput.

Figure 2:
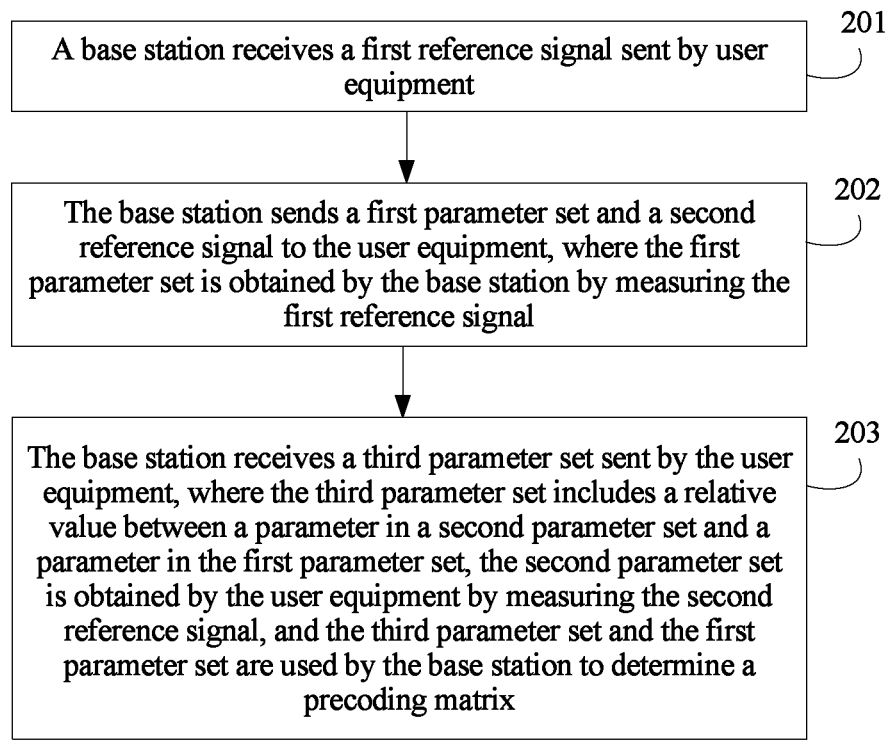
FIG. 2 is a flowchart of a method for reporting channel state information according to an embodiment of the present invention.

A method for reporting channel state information according to an embodiment of the present invention is described with reference to FIG. 2. The method is executed by a base station, and includes the following steps.

Step 201: The base station receives first reference information sent by user equipment.

In an example, a first reference signal may be a sounding reference signal SRS.

Step 202: The base station sends a first parameter set and a second reference signal to the user equipment, where the first parameter set is obtained by the base station by measuring the first reference signal.

The base station may obtain the first parameter set by measuring the first reference signal.

In the following examples, the first parameter set is specifically described by using a TDD system as an example. The first parameter set may be a set of channel parameters between the base station and transmit antennas of the user equipment. It may be assumed that there are S subcarriers in a bandwidth in which the user equipment communicates with the base station. The S subcarriers may be divided into n sub-bands. Each sub-band of a first sub-band to an $(n-1)^{th}$ sub-band includes $$s = \left\lfloor \frac{S}{n} \right\rfloor$$

contiguous subcarriers (where $\lfloor x \rfloor$ represents selecting a maximum integer less than or equal to x), and an $n^{th}$ subcarrier includes S−sn contiguous subcarriers.

It may be assumed that the base station has M antennas, and the user equipment has N1 transmit antennas and N2 receive antennas, where N2>N1. It is assumed that $H_1(i) \in C^{N_1 \times M}$ represents a matrix of downlink channels from the M antennas of the base station to the N1 transmit antennas of the user equipment on an $i^{th}$ subcarrier, and $H_2(i) \in C^{(N_2-N_1) \times M}$ represents a matrix of downlink channels from the M antennas of the base station to the other N2−N1 receive antennas of the user equipment on the $i^{th}$ subcarrier. Then, $$H(i) = \begin{bmatrix} H_1(i) \\ H_2(i) \end{bmatrix} \in C^{N_2 \times M}$$

represents a matrix of downlink channels from the M antennas of the base station to all the receive antennas of the user equipment.

In an example, it may be assumed that $$B = \begin{bmatrix} a_1 & \ldots & a_m & 0 & \ldots & 0 \\ 0 & \ldots & 0 & b_1 & \ldots & b_m \end{bmatrix}$$

represents a base vector matrix known to both the user equipment and the base station, where vectors 0, $a_i$, and $b_i$ (i=1, . . . , m) are all vectors of a dimension M×1.

In an example, the first parameter set may include a first base vector indicator set. The base station may obtain the first base vector indicator set by measuring the first reference signal. A specific process is as follows:

A coefficient $\tilde{H}_1^T(i) \in C^{N_1 \times M}$ of uplink channels from the N1 transmit antennas of the user equipment to the M antennas of the base station on each subcarrier is estimated. According to channel reciprocity, the base station estimates a coefficient $\tilde{H}_1(i)$ (where $\tilde{H}_1^T$ represents transposition of a matrix $\tilde{H}_1$) of downlink channels from the M antennas of the base station to the N1 transmit antennas of the user equipment, namely, a base station-side estimated value of $H_1(i)$.

The base station performs correlation matrix averaging on the channel matrix estimations $\tilde{H}_1(i)$ on each subcarrier in a range of the entire bandwidth, to obtain a mean correlation matrix $$\tilde{R}_1 = \frac{1}{S} \sum_{i=1}^{S} \tilde{H}_1(i)^H \tilde{H}_1(i)$$

in the entire bandwidth. The base station can obtain a primary eigenvector $\tilde{v}_1$ of $\tilde{H}_1$ by performing singular value decomposition (Singular value decomposition, SVD) on $\tilde{R}_1$. To represent signal space in which the primary eigenvector $\tilde{v}_1$ is located, the base station needs to select several columns from the base vector matrix B. For example, an inner product $\tilde{v}_1^H B = [c_1, \ldots, c_m, d_1, \ldots, d_m]$ between the primary eigenvector $\tilde{v}_1$ and each column in the base vector matrix B may be calculated, to obtain projected energy of $\tilde{v}_1$ in each column: $[|c_1|^2, \ldots, |c_m|^2, |d_1|^2, \ldots, |d_m|^2]$.

The base station selects n elements with maximum energy from $|c_i|^2$ (i=1, . . . , m), where indicators of the n elements are $i_1, \ldots,$ and $i_n$, and selects n elements with maximum energy from $|d_i|^2$ (i=1, . . . , m), where indicators of the n elements are $i_{n+1}, \ldots,$ and $i_{2n}$. Therefore, base vectors $a_{i_1}, \ldots, a_{i_n}, b_{i_{n+1}}, \ldots,$ and $b_{i_{2n}}$ are column vectors selected by the base station from the base vector matrix B, and a value of n may be determined by the base station or recommended by the user equipment. Therefore, the base station may obtain a W1 codebook matrix, namely, a first base vector set:

$$\tilde{W}_1 = \begin{bmatrix} a_{i_1} & \ldots & a_{i_n} & 0 & \ldots & 0 \\ 0 & \ldots & 0 & b_{i_{n+1}} & \ldots & b_{i_{2n}} \end{bmatrix}, \quad (1)$$

where the indicators $i_1, \ldots,$ and $i_{2n}$ are the first base vector indicator set in the first parameter set. The indicators in the first base vector indicator set are used to indicate base vectors in a first base vector set. It may be understood that the first base vector set is a set of base vectors selected from the base vector matrix B based on the first base vector indicator set. In other words, it may be considered that the indicators in the first base vector indicator set are used to select the base vectors from the base vector matrix B.

In an example, the first parameter set may further include amplitude information of a first base vector in the first base vector set indicated by the first base vector indicator set. The amplitude information may be relative amplitude information. For example, according to the foregoing method, the base station may obtain the W1 codebook matrix, namely, the first base vector set, and a corresponding amplitude matrix is $\lfloor |c_{i_1}|, |c_{i_2}|, \ldots, |c_{i_n}|, |d_{i_{n+1}}|, \ldots, |d_{i_{2n}}| \rfloor$. Therefore, a relative amplitude matrix P may be represented in a form in which each amplitude is divided by a first amplitude: $\tilde{P}_1 = \lfloor 1, |c_{i_2}|/|c_{i_1}| \ldots, |c_{i_n}|/|c_{i_1}|, |d_{i_{n+1}}|/|c_{i_1}|, \ldots, |d_{i_{2n}}|/|c_{i_1}| \rfloor$. Alternatively, the base station may sort the amplitudes of the first base vector in descending order. For example, an amplitude matrix obtained after the sorting is $\lfloor |c_{i_1}|, |c_{i_2}|, \ldots, |c_{i_n}|, |d_{i_{n+1}}|, \ldots, |d_{i_{2n}}| \rfloor$, where $|c_{i_1}| \geq |c_{i_2}| \geq, \ldots, \geq |c_{i_n}| \geq |d_{i_{n+1}}| \geq, \ldots, \geq |d_{i_{2n}}|$. Therefore, the relative amplitude matrix P may be represented in a form in which each amplitude is divided by a maximum amplitude: $\tilde{P}_1 = \lfloor 1, |c_{i_2}|/|c_{i_1}| \ldots, |c_{i_n}|/|c_{i_1}|, |d_{i_{n+1}}|/|c_{i_1}|/|c_{i_1}| \rfloor$. Alternatively, the base station may obtain the relative amplitude matrix P by using other calculation methods such as subtraction between amplitudes. This is not limited herein.

In an example, the first parameter set may further include a combination coefficient phase of a first base vector in the first base vector set indicated by the first base vector indicator set. A method in which the base station calculates the combination coefficient phase of the first base vector is specifically as follows: The base station calculates a mean correlation matrix of the channel matrix estimations $\tilde{H}(i)$ on each sub-band. A calculation method is similar to the method for calculating the wideband mean correlation matrix $\hat{R}_1$ in the foregoing content, and a difference lies in that a subcarrier range for the averaging calculation falls within each sub-band rather than the entire bandwidth. For example, a mean correlation matrix of a $p^{th}$ ($1 \leq p \leq n$) sub-band is $$\tilde{R}_1(p) = \frac{1}{s} \sum_{i=1+(p-1)s}^{ps} \tilde{H}_1(i)^H \tilde{H}_1(i).$$

Likewise, an eigenvector $\tilde{v}_1(p)$ of the mean correlation matrix of the sub-band may be obtained. To represent the primary eigenvector $\tilde{v}_1(p)$ by using the W1 codebook in expression (1), in an example, the base station may obtain a combination coefficient of the sub-band by using $\tilde{c}(p) = W_1^{-1} \tilde{v}_1(p)$, where $W_1^{-1} = (W_1^H W_1)^{-1} W_1^H$ is an inverse matrix of the W1 codebook matrix $W_1$, and $\tilde{c}(p)$ is a complex vector of a dimension 2n×1. Further, a phase of each vector in $\tilde{c}(p)$ is selected, and a phase of an $i^{th}$ vector is denoted as $\alpha_i(p) \in [0, 2\pi)$. Therefore, a combination coefficient phase $\tilde{\alpha}_i(p)=(i=1,\ldots,2n)$ of the $p^{th}$ sub-band and an amplitude matrix $\tilde{P}_1$ constitute a W2 codebook of the sub-band.

In the following examples, the first parameter set is specifically described by using an FDD system as an example. The first parameter set is a set of parameters of a first frequency band used when the base station and the user equipment perform uplink communication, in other words, may be a set of channel parameters between the base station and transmit antennas of the user equipment. It may be assumed that there are S subcarriers on the first frequency band through which the user equipment and the base station perform uplink communication. The S subcarriers may be divided into n sub-bands. Each sub-band of a first sub-band to an $(n-1)^{th}$ sub-band includes $$s = \left\lfloor \frac{S}{n} \right\rfloor$$

contiguous subcarriers (where $\lfloor x \rfloor$ represents selecting a maximum integer less than or equal to x), and an $n^{th}$ subcarrier includes $S-sn$ contiguous subcarriers. There are S' subcarriers on a second frequency band through which the user equipment and the base station perform downlink communication, and S' and S may be equal or unequal.

It is assumed that $H_1(i) \in C^{M \times N_1}$ represents a matrix of uplink channels from N1 transmit antennas of the user equipment to M antennas of the base station on an $i^{th}$ subcarrier on the first frequency band, and $H(i) \in C^{(N_1+N_2) \times M}$ represents a matrix of downlink channels from the M antennas of the base station to all receive antennas of the user equipment on an $i^{th}$ subcarrier on the second frequency band.

It is assumed that $$B = \begin{bmatrix} a_1 & \ldots & a_m & 0 & \ldots & 0 \\ 0 & \ldots & 0 & b_1 & \ldots & b_m \end{bmatrix}$$

represents a base vector matrix known to both the user equipment and the base station, where vectors 0, $a_i$, and $b_i$ (i=1, ..., m) are all vectors of a dimension M×1.

In an example, the first parameter set may include a first base vector indicator set. The base station may obtain the first base vector indicator set by measuring the first reference signal. A specific process is as follows:

The base station measures the first reference signal on the first frequency band, and estimates a coefficient of uplink channels from the N1 transmit antennas of the user equipment to the M antennas of the base station on each subcarrier on the first frequency band, to obtain $\tilde{H}_1(i)$, namely, a base station-side estimated value of $H_1(i)$.

The base station performs correlation matrix averaging on the channel matrix estimations $\tilde{H}_1(i)$ on each subcarrier in a range of the first frequency band, to obtain a mean correlation matrix $$\tilde{R}_1 = \frac{1}{S} \sum_{i=1}^{S} \tilde{H}_1(i) \tilde{H}_1(i)^H$$

in an entire bandwidth of the first frequency band. The base station can obtain a primary eigenvector $\tilde{v}_1$ of $\tilde{H}_1$ by performing singular value decomposition on $\tilde{R}_1$. To represent signal space in which the primary eigenvector $\tilde{v}_1$ is located, the base station needs to select several columns from the base vector matrix B. In an example, an inner product $\tilde{v}_1^H B = [c_1, \ldots, c_m, d_1, \ldots, d_m]$ between the primary eigenvector $\tilde{v}_1$ and each column in the base vector matrix B may be calculated, to obtain projected energy of $\tilde{v}_1$ in each column: $[|c_1|^2, \ldots, |c_m|^2, |d_1|^2, \ldots, |d_m|^2]$. The base station selects n elements with maximum energy from $|c_i|^2$ (i=1, ..., m), where reference signs of the n elements are $i_1, \ldots,$ and $i_n$, and selects n elements with maximum energy from $|d_i|^2$ (i=1, ..., m), where reference signs of the n elements are $i_{n+1}, \ldots,$ and $i_{2n}$. Therefore, base vectors $a_{i_1}, \ldots, a_{i_n}, b_{i_{n+1}}, \ldots,$ and $b_{i_{2n}}$ in the base vector matrix B are column vectors by the base station, and a value of n may be determined by the base station or recommended by the user equipment. Therefore, the base station may obtain a W1 codebook matrix:

$$\tilde{W}_1 = \begin{bmatrix} a_{i_1} & \ldots & a_{i_n} & 0 & \ldots & 0 \\ 0 & \ldots & 0 & b_{i_{n+1}} & \ldots & b_{i_{2n}} \end{bmatrix}, \quad (2)$$

where the indicators $i_1, \ldots,$ and $i_{2n}$ are the first base vector indicator set in the first parameter set. The indicators in the first base vector indicator set are used to indicate base vectors in a first base vector set. It may be understood that the first base vector set is a set of base vectors selected from the base vector matrix B based on the first base vector indicator set. In other words, it may be considered that the indicators in the first base vector indicator set are used to select the base vectors from the base vector matrix B.

In an example, the first parameter set may further include amplitude information of a first base vector in the first base vector set indicated by the first base vector indicator set. The amplitude information may be relative amplitude information. For example, according to the foregoing method, the base station may obtain the W1 codebook matrix, namely, the first base vector set, and a corresponding amplitude matrix is $\lfloor |c_{i_1}|, |c_{i_2}|, \ldots, |c_{i_n}|, |d_{i_{n+1}}|, \ldots, |d_{i_{2n}}| \rfloor$. Therefore, a relative amplitude matrix P may be represented in a form in which each amplitude is divided by a first amplitude: $\tilde{P}_1 = \lfloor 1, |c_{i_2}|/|c_{i_1}|, \ldots, |c_{i_n}|/|c_{i_1}|, |d_{i_{n+1}}|/|c_{i_1}|, \ldots, |d_{i_{2n}}|/|c_{i_1}| \rfloor$. Alternatively, the base station may sort the amplitudes of the first base vector in descending order. For example, an amplitude matrix obtained after the sorting is $\lfloor |c_{i_1'}|, |c_{i_2'}|, \ldots, |c_{i_n'}|, |d_{i_{n+1}'}|, \ldots, |d_{i_{2n}'}| \rfloor$, where $|c_{i_1'}| \geq |c_{i_2'}| \geq \ldots, \geq |c_{i_n'}| \geq |d_{i_{n+1}'}| \geq \ldots, \geq |d_{i_{2n}'}|$. Therefore, the relative amplitude matrix P may be represented in a form in which each amplitude is divided by a maximum amplitude: $\tilde{P}_1 = \lfloor 1, |c_{i_2'}|/|c_{i_1'}| \ldots, |c_{i_n'}|/|c_{i_1'}|, |d_{i_{n+1}'}|/|c_{i_1'}|/|c_{i_1'}| \rfloor$. Alternatively, the base station may obtain the relative amplitude matrix P by using other calculation methods, for example, subtraction between amplitudes. This is not limited herein.

In an example, the second reference signal sent by the base station to the user equipment includes a CSI-RS.

Step 203: The base station receives a third parameter set sent by the user equipment, where the third parameter set includes a relative value between a parameter in a second parameter set and a parameter in the first parameter set, the second parameter set is obtained by the user equipment by measuring the second reference signal, and the third parameter set and the first parameter set are used by the base station to determine a precoding matrix.

After receiving the second reference signal sent by the base station, the user equipment may obtain the second parameter set by measuring the second reference signal, calculate the relative value between the parameter in the second parameter set and the parameter in the first parameter set, and place the relative value between the parameter in the second parameter set and the parameter in the first parameter set in the third parameter set, or use the relative value as the third parameter set to send the third parameter set to the base station. After receiving the third parameter sent by the user equipment, the base station may determine the precoding matrix based on the third parameter set and the first parameter.

In the following examples, this step is specifically described by using the TDD system as an example. The second parameter set may be a set of channel parameters between the base station and all the receive antennas of the user equipment.

In an example, the second parameter set may include a second base vector indicator set. The user equipment may estimate a user equipment-side estimated value $$\hat{H}(i) = \begin{bmatrix} \hat{H}_1(i) \\ \hat{H}_2(i) \end{bmatrix} \in C^{N_2 \times M}$$

of the channels H(i) between the base station and all the receive antennas of the user equipment on each subcarrier by measuring the CSI-RS, where $\hat{H}_1(i)$ is a user equipment-side estimated value of $H_1(i)$, and $\hat{H}_2(i)$ is a user equipment-side estimated value of $H_2(i)$.

The user equipment performs correlation matrix averaging on the channel matrix estimated values $\hat{H}(i)$ on each subcarrier in the range of the entire bandwidth, to obtain a mean correlation matrix $$\hat{R} = \frac{1}{S} \sum_{i=1}^{S} \hat{H}(i)^H \hat{H}(i)$$

in the entire bandwidth. The user equipment can obtain a primary eigenvector $\hat{v}$ of $\hat{H}(i)$ by performing singular value decomposition on $\hat{R}$. To represent signal space in which the primary eigenvector $\hat{v}$ is located, the base station needs to select several columns from the base vector matrix B. There are a plurality of selection methods. For example, similar to the method in which the base station obtains the first base vector set, the user equipment may calculate an inner product between the primary eigenvector $\hat{v}$ and each column of the base vector matrix B, so that the user equipment can obtain reference signs of base vectors that contribute most energy to the primary eigenvector $\hat{v}$. The reference signs are represented as $j_1, \ldots, j_n, j_{n+1}, \ldots,$ and $j_{2n}$, and base vectors corresponding to the reference signs in the base vector matrix B are $a_{j_1}, \ldots, a_{j_n}, b_{j_{n+1}}, \ldots,$ and $b_{j_{2n}}$. Therefore, user equipment may obtain a channel wideband W1 codebook between the base station and all the receive antennas of the user equipment:

$$\hat{W}_1 = \begin{bmatrix} a_{j_1} & \ldots & a_{j_n} & 0 & \ldots & 0 \\ 0 & \ldots & 0 & b_{j_{n+1}} & \ldots & b_{j_{2n}} \end{bmatrix}, \quad (3)$$

where a set of the indicators $j_1, \ldots, j_n, j_{n+1}, \ldots,$ and $j_{2n}$ is the second base vector indicator set in the second parameter set. The indicators in the second base vector indicator set are used to indicate base vectors in a second base vector set. It may be understood that the second base vector set is a set of base vectors selected from the base vector matrix B based on the second base vector indicator set. In other words, it may be considered that the indicators in the second base vector indicator set are used to indicate the base vectors in the base vector matrix B. There are a plurality of methods for obtaining the W1 codebook. No exclusion is made herein.

In an example, the second parameter set may further include amplitude information of a second base vector indicated by the second base vector indicator set. According to the foregoing method, the user equipment may obtain the W1 codebook matrix of the channels between the base station and all the receive antennas of the user equipment, namely, the second base vector set, and a corresponding amplitude matrix is $\lfloor |e_{j_1}|, |e_{j_2}|, \ldots, |e_{j_n}|, |f_{j_{n+1}}|, \ldots, |f_{j_{2n}}| \rfloor$. Therefore, a relative amplitude matrix $\hat{P}$ may be represented in a form in which each amplitude is divided by a first amplitude: $\hat{P}_1 = \lfloor 1, |e_{j_2}|/|e_{j_1}|, \ldots, |e_{j_n}|/|e_{j_1}|, |f_{j_{n+1}}|/|e_{j_1}|, \ldots, |f_{j_{2n}}|/|e_{j_1}| \rfloor$. Alternatively, the base station may sort the amplitudes of the second base vector in descending order. For example, an amplitude matrix obtained after the sorting is $\lfloor |e_{i_1}|, |e_{i_2}|, \ldots, |e_{i_n}|, |f_{i_{n+1}}|, \ldots, |f_{i_{2n}}| \rfloor$, where $|e_{i_1}| \geq |e_{i_2}| \geq, \ldots, \geq |e_{i_n}| \geq |f_{i_{n+1}}| \geq, \ldots, \geq |f_{i_{2n}}|$. Therefore, the relative amplitude matrix $\hat{P}$ may be represented in a form in which each amplitude is divided by a maximum amplitude: $\hat{P}_1 = \lfloor 1, |e_{i_2}|/|e_{i_1}|, \ldots, |e_{i_n}|/|e_{i_1}|, |f_{i_{n+1}}|/|e_{i_1}|, \ldots, |f_{i_{2n}}|/|e_{i_1}| \rfloor$. Alternatively, the base station may obtain the relative amplitude matrix P by using other calculation methods such as subtraction between amplitudes. This is not limited herein.

In an example, the second parameter set may include a combination coefficient phase of the second base vector in the second base vector set. A method in which the user equipment calculates the combination coefficient phase of the second base vector is similar to the method in which the base station calculates the combination coefficient phase of the first base vector. The user equipment calculates a mean correlation matrix of the channel matrix $\hat{H}(i)$ between the base station and all the receive antennas of the user equipment on each sub-band of the channels between the base station and all the receive antennas of the user equipment. A calculation method is similar to the method for calculating the wideband mean correlation matrix $\hat{R}_1$ in the foregoing content, and a difference lies in that a subcarrier range for the averaging calculation falls within each sub-band rather than the entire bandwidth. For example, a mean correlation matrix of a $p^{th}(1 \leq p \leq n)$ sub-band is $$\hat{R}(p) = \frac{1}{s} \sum_{i=1+(p-1)s}^{ps} \hat{H}(i)^H \hat{H}(i).$$

Likewise, an eigenvector $\hat{v}(p)$ of the mean correlation matrix of the sub-band may be obtained. To represent the primary eigenvector $\hat{v}(p)$ by using the W1 codebook in expression (3), in an example, the user equipment may obtain a combination coefficient of the sub-band by using $\hat{c}(p) = \hat{W}_1^{-1} \hat{v}(p)$, where $\hat{W}_1^{-1} = (\hat{W}_1^H \hat{W}_1)^{-1} \hat{W}_1^H$ is an inverse matrix of the W1 codebook matrix $\hat{W}_1$, and $\hat{c}(p)$ is a complex vector of a dimension $2n \times 1$. Further, a phase of each element in $\hat{c}(p)$ is selected, and a phase of an $i^{th}$ element is denoted as $\hat{\beta}_i(p) \in [0, 2\pi)$. Therefore, a) combination coefficient phase $\hat{\beta}_i(p)$ (i=1, . . . , 2n) of the $p^{th}$ sub-band and an amplitude matrix $\hat{P}$ constitute a W2 codebook of the sub-band.

In an example, the user equipment may obtain, through calculation, an amplitude matrix corresponding to the base vectors in the first base vector set. Specifically, the user equipment may construct a W1 codebook of channels between the base station and the transmit antennas of the user equipment, namely, expression (1) in the foregoing example in which TDD is used as an example, based on the first base vector indicator set in the first parameter set, namely, the indicators $i_1$, . . . , and $i_{2n}$. The user equipment may obtain an amplitude matrix $\hat{P}_1$ corresponding to the W1 codebook of the channels between the base station and the transmit antennas of the user equipment, namely, the amplitude matrix corresponding to the base vectors in the first base vector set based on the W1 codebook, constructed by the user equipment, of the channels between the base station and the transmit antennas of the user equipment by using the method for obtaining an amplitude matrix of base vectors described above.

In an example, the user equipment may obtain, through calculation, a combination coefficient phase of the base vectors in the first base vector set. The user equipment may further construct a W1 codebook of channels between the base station and the transmit antennas of the user equipment, namely, expression (1) in the foregoing example in which TDD is used as an example, based on the first base vector indicator set in the first parameter set, namely, the indicators $i_1$, . . . , $i_{2n}$. The user equipment may calculate a combination coefficient phase $\hat{\alpha}_i(p) \in [0, 2\pi)$ of $\hat{H}_1(i)$ on the $p^{th}$ sub-band, namely, the combination coefficient phase of the base vectors in the first base vector set based on the W1 codebook, constructed by the user equipment, of the channels between the base station and the transmit antennas of the user equipment by using the method for obtaining a combination coefficient phase described above.

In the following examples, the second parameter set is specifically described by using the FDD system as an example. The second parameter set is a set of parameters of a second frequency band used when the base station and the user equipment perform downlink communication, in other words, may be a set of channel parameters between the base station and all receive antennas of the user equipment.

In an example, the second parameter set may include a second base vector indicator set. The user equipment may estimate a user equipment-side estimated value $\hat{H}(i)$ of $H(i)$ on each subcarrier on the second frequency band between the base station and the user equipment by measuring the CSI-RS. The user equipment may calculate a mean correlation matrix $$\hat{R} = \frac{1}{S} \sum_{i=1}^{S} \hat{H}(i)^H \hat{H}(i)$$

of a matrix $\hat{H}(i)$ of downlink channels on the second frequency band and a primary eigenvector $\hat{v}$ of $\hat{H}(i)$ with reference to the calculation method in which the base station obtains the first parameter set. Similar to the calculation method in which the base station obtains the first parameter set, for example, the user equipment may calculate an inner product between $\hat{v}$ and each column of the base vector matrix B, to obtain base vector indicators that contribute most energy to the primary eigenvector $\hat{v}$. The base vector indicators are represented as $j_1$, . . . , $j_n$, $j_{n+1}$, . . . , and $j_{2n}$, and base vectors corresponding to the base vector indicators in the base vector matrix B are $a_{j_1}$, . . . , $a_{j_n}$, $b_{j_{n+1}}$, . . . , and $b_{j_{2n}}$. Therefore, the user equipment may obtain a W1 codebook of the second frequency band:

$$\hat{W}_1 = \begin{bmatrix} a_{j_1} & \cdots & a_{j_n} & 0 & \cdots & 0 \\ 0 & \cdots & 0 & b_{j_{n+1}} & \cdots & b_{j_{2n}} \end{bmatrix}, \quad (4)$$

where a set of the indicators $j_1$, . . . , $j_n$, $j_{n+1}$, . . . , and $j_{2n}$ is the second base vector indicator set in the second parameter set. The indicators in the second base vector indicator set are used to indicate base vectors in a second base vector set. It may be understood that the second base vector set is a set of base vectors selected from the base vector matrix B based on the second base vector indicator set. In other words, it may be considered that the indicators in the second base vector indicator set are used to indicate the base vectors in the base vector matrix B. There are a plurality of methods for obtaining the W1 codebook. No exclusion is made herein.

In an example, the second parameter set may further include amplitude information of a second base vector indicated by the second base vector indicator set. According to the foregoing method, the user equipment may obtain the W1 codebook matrix of the second frequency band, namely the second base vector set, and an amplitude matrix thereof is $\lfloor |e_{j_1}|, |e_{j_2}|, \ldots, |e_{j_n}|, |f_{j_{n+1}}|, \ldots, |f_{j_{2n}}| \rfloor$. Therefore, a relative amplitude matrix P may be represented in a form in which each amplitude is divided by a first amplitude: $\hat{P}_1 = \lfloor 1, |e_{j_2}|/|e_{j_1}|, \ldots, |e_{j_n}|/|e_{j_1}|, |f_{j_{n+1}}|/|e_{j_1}|, \ldots, |f_{j_{2n}}|/|e_{j_1}| \rfloor$. Alternatively, the base station may sort the amplitudes of the first base vector in descending order. For example an amplitude matrix obtained after the sorting is $\lfloor |e_{i_1}|, |e_{i_2}|, \ldots, |e_{i_n}|, |f_{i_{n+1}}|, \ldots, |f_{i_{2n}}| \rfloor$, where $|e_{i_1}| \geq |e_{i_2}| \geq \ldots \geq |e_{i_n}| \geq |f_{i_{n+1}}| \geq \ldots \geq |f_{i_{2n}}|$. Therefore, the relative amplitude matrix P may be represented in a form in which each amplitude is divided by a maximum amplitude: $\hat{P}_1 = \lfloor 1, |e_{i_2}|/|e_{i_1}|, \ldots, |e_{i_n}|/|e_{i_1}|, |f_{i_{n+1}}|/|e_{i_1}|, \ldots, |f_{i_{2n}}|/|e_{i_1}| \rfloor$. Alternatively, the base station may obtain the relative amplitude matrix P by using other calculation methods such as subtraction between amplitudes. This is not limited herein.

In an example, the second parameter set may further include a combination coefficient phase of the second base vector in the second base vector set. A method in which the user equipment calculates the combination coefficient phase of the second base vector is similar to the method in which the base station calculates the combination coefficient phase of the first base vector. The user equipment calculates a mean correlation matrix of the matrix $\hat{H}(i)$ of the second frequency band on each sub-band of the second frequency band. A calculation method is similar to the method for calculating the mean correlation matrix in a wideband range in the foregoing content, and a difference lies in that a subcarrier range for the averaging calculation falls within each sub-band rather than the entire bandwidth. For example, a mean correlation matrix of a $p^{th}$ ($1 \leq p \leq n$) sub-band is $$\hat{R}(p) = \frac{1}{s} \sum_{i=1+(p-1)s}^{ps} \hat{H}(i)^H \hat{H}(i).$$

Likewise, an eigenvector $\hat{v}(p)$ of the mean correlation matrix of the sub-band may be obtained. In an example, the user equipment may obtain a combination coefficient of the sub-band by using $\hat{c}(p)=\hat{W}_1^{-1}\hat{v}(p)$, where $\hat{W}_1^{-1}=(\hat{W}_1^H\hat{W}_1)^{-1}\hat{W}_1^H$ is an inverse matrix of the W1 codebook matrix $\hat{W}_1$, and $\hat{c}(p)$ is a vector of a dimension $2n\times 1$. Further, a phase of each element in $\hat{c}(p)$ is selected, and a phase of an $i^{th}$ element is denoted as $\hat{\beta}_i(p)\in[0,2\pi)$. Therefore, a combination coefficient phase $\hat{\beta}_i(p)(i=1,\ldots,2n)$ of the $p^{th}$ sub-band and an amplitude matrix $\hat{P}$ constitute a W2 codebook of the sub-band.

In an example, the relative value between the parameter in the second parameter set and the parameter in the first parameter set may include a relative value between an indicator in the second base vector indicator set and an indicator in the first base vector indicator set. The relative value may be specifically one or more of a difference, a ratio, and a sum. By using the difference as an example, the relative value between the indicator in the second base vector indicator set and the indicator in the first base vector indicator set may be $x_1=i_1-j_1,\ldots$, and $x_{2n}=i_{2n}-j_{2n}$, and there are 2n relative values in total.

In an example, the relative value between the parameter in the second parameter set and the parameter in the first parameter set may include a relative value between second base vector amplitude information in the second base vector set and first base vector amplitude information in the first base vector set. In an example, the first base vector amplitude information in the first base vector set is calculated and then sent by the base station to the user equipment, so that the user equipment calculates the relative value. In an example, the first base vector amplitude information in the first base vector set is calculated by the user equipment based on the first parameter set and the second reference signal. The relative value between the second base vector amplitude information in the second base vector set and the first base vector amplitude information in the first base vector set may be one or more of a difference, a ratio, and a sum. By using the difference as an example, the relative value between the second base vector amplitude information in the second base vector set and the first base vector amplitude information in the first base vector set may be $\Delta P_i=P_i-P_i(i=1,\ldots,2n)$, and there are 2n relative values in total.

In an example, the relative value between the parameter in the second parameter set and the parameter in the first parameter set may include a relative value between a second base vector combination coefficient phase and a first base vector combination coefficient phase. In an example, the first base vector combination coefficient phase is calculated and then sent by the base station to the user equipment, so that the user equipment calculates the relative value. In an example, the first base vector combination coefficient phase is calculated by the user equipment based on the first parameter set and the second reference signal. The relative value between the second base vector combination coefficient phase and the first base vector combination coefficient phase may be one or more of a difference, a ratio, and a sum. By using the difference as an example, the relative value between the second base vector combination coefficient phase and the first base vector combination coefficient phase may be $z_i(p)=\hat{\alpha}_i(p)-\hat{\beta}_i(p)$ $(i=1,\ldots,2n$, and $p=1,\ldots,s)$, and there are 2 ns relative values in total, where s is a quantity of sub-bands.

It should be noted that two or more of the relative values in the foregoing examples may be included at the same time during specific implementation.

After receiving the third parameter sent by the user equipment, the base station may correct the first parameter set based on the third parameter set, to obtain the precoding matrix for data precoding.

In an example, the third parameter set may include the relative value between the indicator in the second base vector indicator set and the indicator in the first base vector indicator set, and the relative value may be $x_1=i_1-j_1,\ldots$, and $x_{2n}=i_{2n}-j_{2n}$. The base station may correct indicators in the first base vector indicator set by using the relative value. A specific calculation process may be as follows: Corrected base vector indicators may be $y_1=i_1-x_1,\ldots$, and $y_{2n}=i_{2n}-x_{2n}$. The third parameter set may further include the relative value between the second base vector amplitude information in the second base vector set and the first base vector amplitude information in the first base vector set, and the relative value may be $\Delta P_i=P_i-P_i(i=1,\ldots,2n)$. The base station may correct the first base vector amplitude information by using the relative value. A specific calculation process may be as follows: A corrected base vector matrix amplitude is $P_i=\hat{P}_i-\Delta P_i(i=1,\ldots,2n)$. The third parameter set may include the relative value between the second base vector combination coefficient phase and the first base vector combination coefficient phase, and the relative value may be $z_i(p)=\hat{\alpha}_i(p)-\hat{\beta}_i(p)$. The base station may correct the first base vector combination coefficient phase of the $p^{th}$ sub-band by using the relative value. A specific calculation process may be as follows: A corrected base vector combination coefficient phase is $\alpha_i(p)=\hat{\alpha}_i(p)-z_i(p)$. The base station may determine the precoding matrix by using the corrected base vector indicators, the corrected base vector amplitude matrix, and the corrected base vector combination coefficient phase.

In an example, the third parameter set may include the relative value between the indicator in the second base vector indicator set and the indicator in the first base vector indicator set. The base station may correct the indicators in the first base vector indicator set by using the relative value, so that the base station obtains the second base vector indicator set. The third parameter may further include the amplitude information of the second base vector in the second base vector set and a combination coefficient phase of the second base vector in the second base vector set. The base station may determine the precoding matrix by using the second base vector indicator set, the amplitude information of the second base vector in the third parameter, and the combination coefficient phase of the second base vector in the third parameter that are obtained by the base station through correction.

In an example, the third parameter set may include the relative value between the indicator in the second base vector indicator set and the indicator in the first base vector indicator set. The base station may correct the indicators in the first base vector indicator set by using the relative value, so that the base station obtains the second base vector indicator set. The third parameter set may further include the relative value between the second base vector amplitude information in the second base vector set and the first base vector amplitude information in the first base vector set. The base station may correct the first base vector amplitude information by using the relative value, so that the base station obtains the second base vector amplitude information in the second base vector set. The third parameter may further include a combination coefficient phase of the second base vector in the second base vector set. The base station may determine the precoding matrix by using the second base vector indicator set obtained by the base station through correction, and the second base vector amplitude information and the combination coefficient phase of the second base vector in the third parameter that are obtained by the base station through correction. In an example, the third parameter set includes the second base vector combination coefficient phase $\beta_i(p)$ (i=1, . . . , 2n; p=1, . . . , s), and there are 2 ns elements in total, where s is a quantity of sub-bands. The base station may obtain a precoding vector by using the corrected base vector indicators $y_1, \ldots,$ and $y_{2n}$, a corrected amplitude matrix P, and a combination coefficient phase $\alpha(P)$ of each sub-band that is reported by the user equipment.

It should be noted that the foregoing examples are merely used to describe the method provided in this embodiment of the present invention. It is easily understood that the third parameter may include only the relative value between the parameter in the second parameter set and the parameter in the first parameter set, or may include both the relative value between the parameter in the second parameter set and the parameter in the first parameter set and the parameter in the second parameter set. The base station may correct the parameter in the first parameter set by using only the relative value between the parameter in the second parameter set and the parameter in the first parameter set, to obtain the parameter in the second parameter set, so as to determine the precoding matrix. Alternatively, the base station may correct the parameter in the first parameter set by using the relative value between the parameter in the second parameter set and the parameter in the first parameter set, to obtain some parameters in the second parameter set, and then determine the precoding matrix with reference to other parameters in the second parameter set.

According to the method for reporting channel state information provided in this embodiment of the present invention, for some or all parameters of channel state information, the user equipment may report only a relative value between a CSI parameter measured by the user equipment and a received CSI parameter measured by the base station, and does not need to report all CSI parameters measured by the user equipment. In this way, a quantity of bits for quantizing a CSI parameter that needs to be reported can be significantly reduced, so as to reduce CSI reporting overheads, and improve a system throughput.

Figure 3:
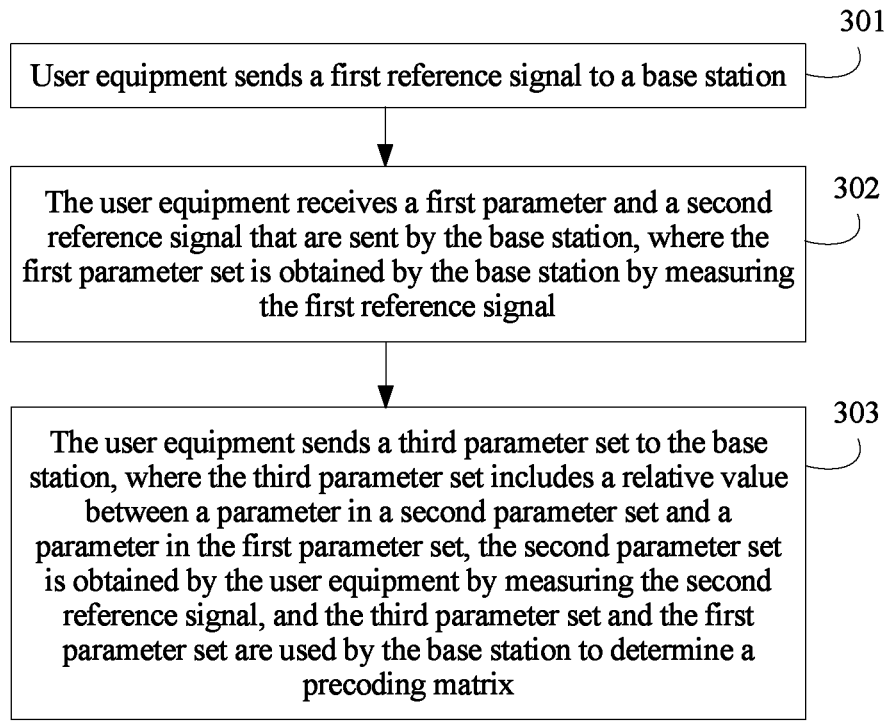
FIG. 3 is a flowchart of another method for reporting channel state information according to an embodiment of the present invention.

An embodiment of the present invention further provides another method for reporting channel state information. The method is executed by user equipment, and the method is specifically described with reference to FIG. 3.

Step 301: The user equipment sends a first reference signal to a base station.

In an example, the first reference signal includes a sounding reference signal SRS.

Step 302: The user equipment receives a first parameter set and a second reference signal that are sent by the base station, where the first parameter set is obtained by the base station by measuring the first reference signal.

In an example, the first parameter set includes parameters of uplink channels from n ports of the user equipment to the base station, and the second parameter set includes parameters of downlink channels from the base station to m ports of the user equipment. The m ports include the n ports, and n and m are positive integers.

In an example, the second reference signal includes a channel state information-reference signal CSI-RS.

Step 303: The user equipment sends a third parameter set to the base station, where the third parameter set includes a relative value between a parameter in a second parameter set and a parameter in the first parameter set, the second parameter set is obtained by the user equipment by measuring the second reference signal, and the third parameter set and the first parameter set are used by the base station to determine a precoding matrix.

In an example, the relative value between the parameter in the second parameter and the parameter in the first parameter includes one or more of a difference between, a ratio between, and a sum of the parameter in the second parameter and the parameter in the first parameter.

In an example, the first parameter set includes a first base vector indicator set. The first base vector indicator set includes at least one first base vector indicator, and the at least one first base vector indicator is used to indicate at least one first base vector in a first base vector set. The second parameter set includes a second base vector indicator set, the second base vector indicator set includes at least one second base vector indicator, and the at least one second base vector indicator is used to indicate at least one second base vector in a second base vector set.

In an example, the third parameter set includes a relative value between the at least one second base vector indicator and the at least one first base vector indicator.

In an example, the third parameter set includes a relative value between second base vector amplitude information and first base vector amplitude information. The first base vector amplitude information is amplitude information of the at least one first base vector, the second base vector amplitude information is amplitude information of the at least one second base vector, and the second base vector amplitude information is obtained by the user equipment based on the second reference signal and the first parameter.

In an example, the third parameter set includes a relative value between a second base vector combination coefficient phase and a first base vector combination coefficient phase, the first base vector combination coefficient phase is a combination coefficient phase of the at least one first base vector, and the second base vector combination phase is a combination coefficient phase of the at least one second base vector. The first base vector combination coefficient phase is obtained by the user equipment based on the second reference signal and the first parameter set.

In an example, that the third parameter set and the first parameter set are used by the base station to determine a precoding matrix includes: the third parameter set is used by the base station to correct the first parameter set, to obtain the second parameter set; and the precoding matrix is determined based on the second parameter set.

In an example, the third parameter set further includes a parameter in the second parameter set.

According to the method for reporting channel state information provided in this embodiment of the present invention, for some or all parameters of channel state information, the user equipment may report only a relative value between a CSI parameter measured by the user equipment and a received CSI parameter measured by the base station, and does not need to report all CSI parameters measured by the user equipment. In this way, a quantity of bits for quantizing a CSI parameter that needs to be reported can be significantly reduced, so as to reduce CSI reporting overheads, and improve a system throughput.

Figure 4:
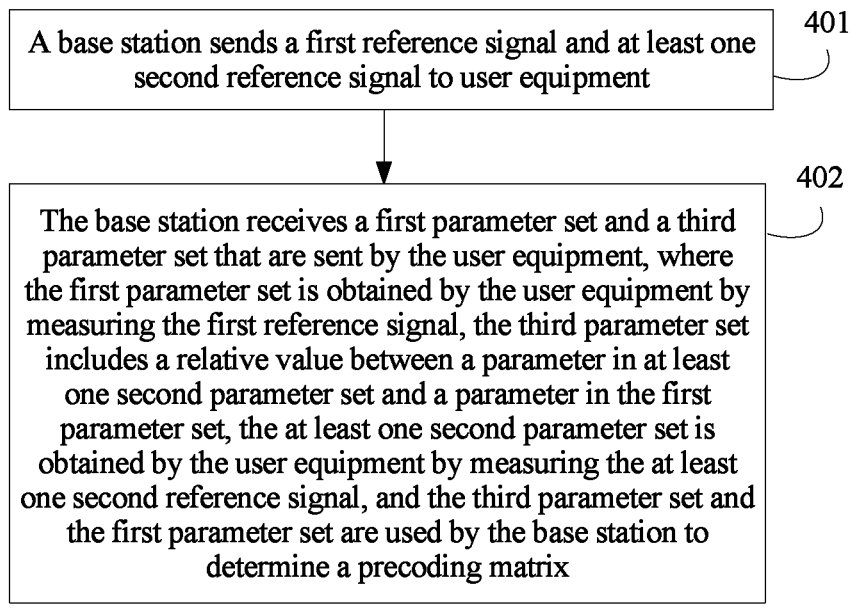
FIG. 4 is a flowchart of still another method for reporting channel state information according to an embodiment of the present invention.

An embodiment of the present invention further provides another method for reporting channel state information. The method is specifically described with reference to FIG. 4, and the method is executed by a base station.

Step 401: The base station sends a first reference signal and at least one second reference signal to user equipment.

The base station sends the first reference signal to the user equipment by using a first frequency band, and sends the at least one second reference signal by using at least one second frequency band.

In an example, the first reference signal includes a channel state information-reference signal CSI-RS of the first frequency band, and the at least one second reference signal includes a channel state information-reference signal CSI-RS of the at least one second frequency band.

Step 402: The base station receives a first parameter set and a third parameter set that are sent by the user equipment, where the first parameter set is obtained by the user equipment by measuring the first reference signal, the third parameter set includes a relative value between a parameter in at least one second parameter set and a parameter in the first parameter set, the at least one second parameter set is obtained by the user equipment by measuring the at least one second reference signal, and the third parameter set and the first parameter set are used by the base station to determine a precoding matrix.

In an example, the first parameter set may include a first base vector indicator set.

It may be assumed that there are S subcarriers on the first frequency band through which the user equipment communicates with the base station. The S subcarriers may be divided into n sub-bands. Each sub-band of a first sub-band to an $(n-1)^{th}$ sub-band includes $$s = \left\lfloor \frac{S}{n} \right\rfloor$$

contiguous subcarriers (where $\lfloor x \rfloor$ represents selecting a maximum integer less than or equal to x), and an $n^{th}$ subcarrier includes S−sn contiguous subcarriers. There are S' subcarriers on the at least one second frequency band through which the user equipment communicates with the base station, and S' and S may be equal or unequal.

It is assumed that $H_1(i) \in C^{N \times M}$ represents a matrix of downlink channels from M antennas of the base station to N1 receive antennas of the user equipment on an $i^{th}$ subcarrier on the first frequency band, and $H_2(i) \in C^{N \times M}$ represents a matrix of downlink channels from the M antennas of the base station to N2 receive antennas of the user equipment on an $i^{th}$ subcarrier on the at least one second frequency band.

In an example, it may be assumed that $$B = \begin{bmatrix} a_1 & \ldots & a_m & 0 & \ldots & 0 \\ 0 & \ldots & 0 & b_1 & \ldots & b_m \end{bmatrix}$$

represents a base vector matrix known to both the user equipment and the base station, where vectors 0, $a_i$, and $b_i$ (i=1, . . . , m) are all vectors of a dimension M×1.

The user equipment measures the first reference signal on the first frequency band, and estimates an estimated value $\tilde{H}_1(i)$ of $H_1(i)$ on each subcarrier on the first frequency band.

The base station performs correlation matrix averaging on the channel matrix estimations $\hat{H}_1(i)$ on each subcarrier in a range of the first frequency band, to obtain a mean correlation matrix $$\hat{R}_1 = \frac{1}{S} \sum_{i=1}^{S} \tilde{H}_1(i) \tilde{H}_1(i)^H$$

in an entire bandwidth of the first frequency band. The base station can obtain a primary eigenvector $\hat{v}_1$ of $\tilde{H}_1$ by performing singular value decomposition on $\hat{R}_1$. To represent signal space in which the primary eigenvector $\hat{v}_1$ is located, the base station needs to select several columns from the base vector matrix B. In an example, an inner product $\tilde{v}_1^H B = [c_1, \ldots, c_m, d_1, \ldots, d_m]$ between the primary eigenvector $\hat{v}_1$ and each column in the base vector matrix B may be calculated, to obtain projected energy of $\hat{v}_1$ in each column: $[|c_1|^2, \ldots, |c_m|^2, |d_1|^2, \ldots, |d_m|^2]$. The base station selects n elements with maximum energy from $|c_i|^2$ (i=1, . . . , m), where indicators of the n elements are $i_1, \ldots,$ and $i_n$, and selects n elements with maximum energy from $|d_i|^2$ (i=1, . . . , m), where indicators of the n elements are $i_{n+1}, \ldots,$ and $i_{2n}$. Therefore, base vectors $a_{i_1}, \ldots, a_{i_n}$, $b_{i_{n+1}}, \ldots,$ and $b_{i_{2n}}$ in the base vector matrix B are column vectors by the base station, and a value of n may be determined by the base station or recommended by the user equipment. Therefore, the base station may obtain a W1 codebook matrix:

$$\tilde{W}_1 = \begin{bmatrix} a_{i_1} & \ldots & a_{i_n} & 0 & \ldots & 0 \\ 0 & \ldots & 0 & b_{i_{n+1}} & \ldots & b_{i_{2n}} \end{bmatrix}, \quad (5)$$

where the indicators $i_1, \ldots,$ and $i_n$ are the first base vector indicator set in the first parameter set. The indicators in the first base vector indicator set are used to indicate base vectors in a first base vector set. It may be understood that the first base vector set is a set of base vectors selected from the base vector matrix B based on the first base vector indicator set. In other words, it may be considered that the indicators in the first base vector indicator set are used to select the base vectors from the base vector matrix B.

In an example, the first parameter set may further include amplitude information of a first base vector in the first base vector set indicated by the first base vector indicator set. The amplitude information may be relative amplitude information. For example, according to the foregoing method, the base station may obtain the W1 codebook matrix, namely, the first base vector set, and a corresponding amplitude matrix is $[|c_{i_1}|, |c_{i_2}|, \ldots, |c_{i_n}|, |d_{i_{n+1}}|, \ldots, |d_{i_{2n}}|]$. Therefore, a relative amplitude matrix P may be represented in a form in which each amplitude is divided by a first amplitude: $\tilde{P}_1 = [1, |c_{i_2}|/|c_{i_1}| \ldots, |c_{i_n}|/|c_{i_1}|, |d_{i_{n+1}}|/|c_{i_1}|, \ldots, |d_{i_{2n}}|/|c_{i_1}|]$. Alternatively, the base station may sort the amplitudes of the first base vector in descending order. For example, an amplitude matrix obtained after the sorting is $[|c_{i_1}|, |c_{i_2}|, \ldots, |c_{i_n}|, |d_{i_{n+1}}|, \ldots, |d_{i_{2n}}|]$, where $|c_{i_1}| \geq |c_{i_2}| \geq, \ldots, \geq |c_{i_n}| \geq |d_{i_{n+1}}| \geq, \ldots, \geq |d_{i_{2n}}|$. Therefore, the relative amplitude matrix P may be represented in a form in which each amplitude is divided by a maximum amplitude: $\tilde{P}_1 = [1, |c_{i_2}|/|c_{i_1}| \ldots, |c_{i_n}|/|c_{i_1}|, |d_{i_{n+1}}|/|c_{i_1}|, \ldots, |d_{i_{2n}}|/|c_{i_1}|]$. Alternatively, the base station may obtain the relative amplitude matrix P by using other calculation methods, for example, subtraction between amplitudes. This is not limited herein. In an example, the at least one second parameter set may include a second base vector indicator set.

The user equipment may estimate a user equipment-side estimated value $\hat{H}_2(i)$ of $H_2(i)$ by measuring the at least one second reference signal on the at least one second frequency band. A mean correlation matrix $$\hat{R} = \frac{1}{S} \sum_{i=1}^{S} \hat{H}_2(i)^H \hat{H}_2(i)$$

of a matrix $\hat{v}_2$ of $\hat{H}_2(i)$ downlink channels on the at least one second frequency band and a primary eigenvector $\hat{v}_2$ of $\hat{H}_2(i)$ may be calculated with reference to a calculation method in which the base station obtains the first base vector set. Similar to the calculation method in which the user equipment obtains the first parameter set, for example, the user equipment may calculate an inner product between $\hat{v}_2$ and each column of the base vector matrix B, to obtain base vector indicators that contribute most energy to the primary eigenvector $\hat{v}_2$. The base vector indicators are represented as $j_1, \ldots, j_n, j_{n+1}, \ldots,$ and $j_{2n}$, and base vectors corresponding to the base vector indicators in the base vector matrix B are $a_{j_1}, \ldots, a_{j_n}, b_{j_{n+1}}, \ldots,$ and $b_{j_{2n}}$. Therefore, the user equipment may obtain a W1 code of the at least one second frequency band:

$$\hat{W}_1 = \begin{bmatrix} a_{j_1} & \cdots & a_{j_n} & 0 & \cdots & 0 \\ 0 & \cdots & 0 & b_{j_{n+1}} & \cdots & b_{j_{2n}} \end{bmatrix}, \quad (6)$$

where a set of the indicators $j_1, \ldots, j_n, j_{n+1}, \ldots,$ and $j_{2n}$ is the second base vector indicator set in the at least one second parameter set. The indicators in the second base vector indicator set are used to indicate base vectors in a second base vector set. It may be understood that the second base vector set is a set of base vectors selected from the base vector matrix B based on the second base vector indicator set. In other words, it may be considered that the indicators in the second base vector indicator set are used to indicate the base vectors in the base vector matrix B. There are a plurality of methods for obtaining the W1 codebook. No exclusion is made herein.

In an example, the at least one second parameter set may further include amplitude information of a second base vector indicated by the second base vector indicator set. According to the foregoing method, the base station may obtain the W1 codebook matrix, namely, the second base vector set, and an amplitude matrix thereof is $\lfloor |e_{j_1}|, |e_{j_2}|, \ldots, |e_{j_n}|, |f_{j_{n+1}}|, \ldots, |f_{j_{2n}}| \rfloor$. Therefore, a relative amplitude matrix P may be represented in a form in which each amplitude is divided by a first amplitude: $P_2=[1, |e_{j_2}|/|e_{j_1}|, \ldots, |e_{j_n}|/|e_{j_1}|, |f_{j_{n+1}}||e_{j_1}|, \ldots, |f_{j_{2n}}||e_{j_1}|]$. Alternatively, the base station may sort the amplitudes of the first base vector in descending order. For example, an amplitude matrix obtained after the sorting is $\lfloor |e_{i_1}|, |e_{i_2}|, \ldots, |e_{i_n}|, |f_{i_{n+1}}|, \ldots, |f_{i_{2n}}| \rfloor$, where $\lfloor |e_{j_1}|, |e_{j_2}|, \ldots, |e_{j_n}|, |f_{j_{n+1}}|, \ldots, |f_{j_{2n}}| \rfloor$. Therefore, the relative amplitude matrix P may be represented in a form in which each amplitude is divided by a maximum amplitude: $P_2=[1, |e_{i_2}|/|e_{i_1}|, \ldots, |e_{i_n}|/|e_{i_1}|, |f_{i_{n+1}}|/|e_{i_1}|, \ldots, |f_{i_{2n}}|/|e_{i_1}|]$. Alternatively, the base station may obtain the relative amplitude matrix P by using other calculation methods such as subtraction between amplitudes. This is not limited herein.

In an example, the at least one second parameter set may further include a combination coefficient phase of a second base vector in the second base vector set. A method in which the user equipment calculates the combination coefficient phase of the second base vector is similar to the method for calculating a combination coefficient phase described above. The user equipment calculates a mean correlation matrix of the channel matrix estimated values $\hat{H}_2(i)$ on each sub-band of the at least one second frequency band. A calculation method is similar to the method for calculating the mean correlation matrix in the wideband range for the foregoing content, and a difference lies in that a subcarrier range in the averaging calculation falls within each sub-band rather than the entire bandwidth. For example, a mean correlation matrix of a $p^{th}(1 \leq p \leq n)$ sub-band is $$\hat{R}(p) = \frac{1}{s} \sum_{i=1+(p-1)s}^{ps} \hat{H}(i)_2^H \hat{H}_2(i).$$

Likewise, an eigenvector $\hat{v}_2(P)$ of the mean correlation matrix of the sub-band may be obtained. In an example, the user equipment may obtain a combination coefficient of the sub-band by using $\hat{c}(p)=\hat{W}_1^{-1}\hat{v}_2(p)$, where $\hat{W}_1^{-1}=(\hat{W}_1^H\hat{W}_1)^{-1}\hat{W}_1^H$ is an inverse matrix of the W1 codebook matrix $\hat{W}_1$, and $\hat{c}(p)$ is a vector of a dimension $2n \times 1$. Further, a phase of each element in $\hat{c}(p)$ is selected, and a phase of an $i^{th}$ element is denoted as $\hat{\beta}_i(p) \in [0, 2\pi)$. Therefore, a combination coefficient phase $\hat{\beta}_i(p)(i=1, \ldots, 2n)$ of the $p^{th}$ sub-band and an amplitude matrix $\hat{P}$ constitute a W2 codebook of the sub-band.

In an example, the relative value between the parameter in the at least one second parameter set and the parameter in the first parameter set may include a relative value between an indicator in the second base vector indicator set and an indicator in the first base vector indicator set. The relative value may be specifically one or more of a difference, a ratio, and a sum. By using the difference as an example, the relative value between the indicator in the second base vector indicator set and the indicator in the first base vector indicator set may be $x_1=i_1-j_1, \ldots, x_{2n}=i_{2n}-j_{2n}$, and there are 2n relative values in total.

In an example, the relative value between the parameter in the at least one second parameter set and the parameter in the first parameter set may include a relative value between second base vector amplitude information in the second base vector set and first base vector amplitude information in the first base vector set. The relative value between the second base vector amplitude information in the second base vector set and the first base vector amplitude information in the first base vector set may be one or more of a difference, a ratio, and a sum. By using the difference as an example, the relative value between the second base vector amplitude information in the second base vector set and the first base vector amplitude information in the first base vector set may be $\Delta P=P_1-P_2$, and there are 2n relative values in total.

After receiving the third parameter set and the first parameter set that are sent by the user equipment, the base station may correct the first parameter set based on the third parameter set, to obtain the precoding matrix for data precoding on the at least one second frequency band.

In an example, the third parameter set may include the relative value between the indicator in the second base vector indicator set and the indicator in the first base vector indicator set. The base station may correct indicators in the first base vector indicator set by using the relative value, so that the base station obtains the second base vector indicator set. The third parameter may further include the amplitude information of the second base vector in the second base vector set and a combination coefficient phase of the second base vector in the second base vector set. The base station may determine the precoding matrix by using the second base vector indicator set, the amplitude information of the second base vector in the third parameter, and the combination coefficient phase of the second base vector in the third parameter that are obtained by the base station through correction.

In an example, the third parameter set may include the relative value between the indicator in the second base vector indicator set and the indicator in the first base vector indicator set. The base station may correct indicators in the first base vector indicator set by using the relative value, so that the base station obtains the second base vector indicator set. The third parameter set may further include the relative value between the second base vector amplitude information in the second base vector set and the first base vector amplitude information in the first base vector set. The base station may correct the first base vector amplitude information by using the relative value, so that the base station obtains the second base vector amplitude information in the second base vector set. The third parameter may further include a combination coefficient phase of the second base vector in the second base vector set. The base station may determine the precoding matrix by using the second base vector indicator set obtained by the base station through correction, and the second base vector amplitude information and the combination coefficient phase of the second base vector in the third parameter that are obtained by the base station through correction. In an example, the third parameter set includes the second base vector combination coefficient phase $\beta_i(p)$ (i=1, ..., 2n; p=1, s), and there are 2 ns elements in total, where s is a quantity of sub-bands. The base station may obtain a precoding vector by using the corrected base vector indicators $y_1, \ldots,$ and $y_{2n}$, a corrected amplitude matrix P, and a combination coefficient phase $\alpha(P)$ of each sub-band that is reported by the user equipment.

It should be noted that the foregoing examples are merely used to describe the method provided in this embodiment of the present invention. It is easily understood that the third parameter may include only the relative value between the parameter in the second parameter set and the parameter in the first parameter set, or may include both the relative value between the parameter in the second parameter set and the parameter in the first parameter set and the parameter in the second parameter set. The base station may correct the parameter in the first parameter set by using only the relative value between the parameter in the second parameter set and the parameter in the first parameter set, to obtain the parameter in the second parameter set, so as to determine the precoding matrix. Alternatively, the base station may correct the parameter in the first parameter set by using the relative value between the parameter in the second parameter set and the parameter in the first parameter set, to obtain some parameters in the second parameter set, and then determine the precoding matrix with reference to other parameters in the second parameter in the third parameter.

According to the method provided in this embodiment of the present invention, for some or all parameters of channel state information, the user equipment may report only a CSI parameter of the first frequency band and a relative value between a CSI parameter of the at least one second frequency band and the CSI parameter of the first frequency band, and does not need to report all CSI parameters of the at least one second frequency band. In this way, a quantity of bits for quantizing a CSI parameter that needs to be reported can be significantly reduced, so as to reduce CSI reporting overheads, and improve a system throughput.

Figure 5:
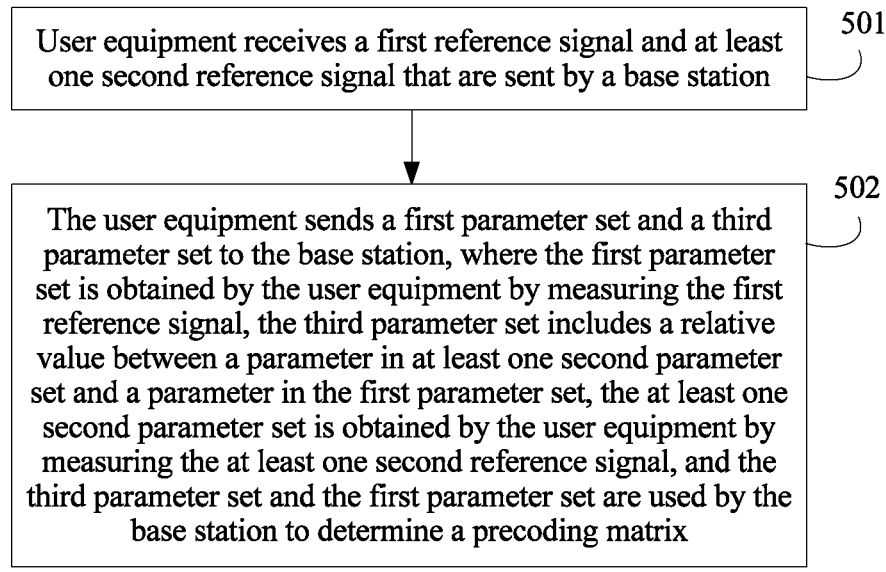
FIG. 5 is a flowchart of yet another method for reporting channel state information according to an embodiment of the present invention.

An embodiment of the present invention further provides another method for reporting channel state information. The method is executed by user equipment, and the method is described with reference to FIG. 5.

Step 501: The user equipment receives a first reference signal and at least one second reference signal that are sent by a base station.

In an example, the first reference signal includes a channel state information-reference signal CSI-RS of a first frequency band, and the at least one second reference signal includes a channel state information-reference signal CSI-RS of at least one second frequency band.

Step 502: The user equipment sends a first parameter set and a third parameter set to the base station, where the first parameter set is obtained by the user equipment by measuring the first reference signal, the third parameter set includes a relative value between a parameter in at least one second parameter set and a parameter in the first parameter set, the at least one second parameter set is obtained by the user equipment by measuring the at least one second reference signal, and the third parameter set and the first parameter set are used by the base station to determine a precoding matrix.

In an example, the relative value between the parameter in the at least one second parameter and the parameter in the first parameter includes one or more of a difference between, a ratio between, and a sum of the parameter in the at least one second parameter and the parameter in the first parameter.

In an example, the first parameter set includes a first base vector indicator set. The first base vector indicator set includes at least one first base vector indicator, and the at least one first base vector indicator is used to indicate at least one first base vector in a first base vector set. The at least one second parameter set includes a second base vector indicator set, the second base vector indicator set includes at least one second base vector indicator, and the at least one second base vector indicator is used to indicate at least one second base vector in a second base vector set.

In an example, the third parameter set includes a relative value between the at least one second base vector indicator and the at least one first base vector indicator.

In an example, the third parameter set includes a relative value between second base vector amplitude information and first base vector amplitude information. The first base vector amplitude information is amplitude information of the at least one first base vector, and the second base vector amplitude information is amplitude information of the at least one second base vector.

According to the method provided in this embodiment of the present invention, for some or all parameters of channel state information, the user equipment may report only a CSI parameter of the first frequency band and a relative value between a CSI parameter of the at least one second frequency band and the CSI parameter of the first frequency band, and does not need to report all CSI parameters of the at least one second frequency band. In this way, a quantity of bits for quantizing a CSI parameter that needs to be reported can be significantly reduced, so as to reduce CSI reporting overheads, and improve a system throughput.

Figure 6:
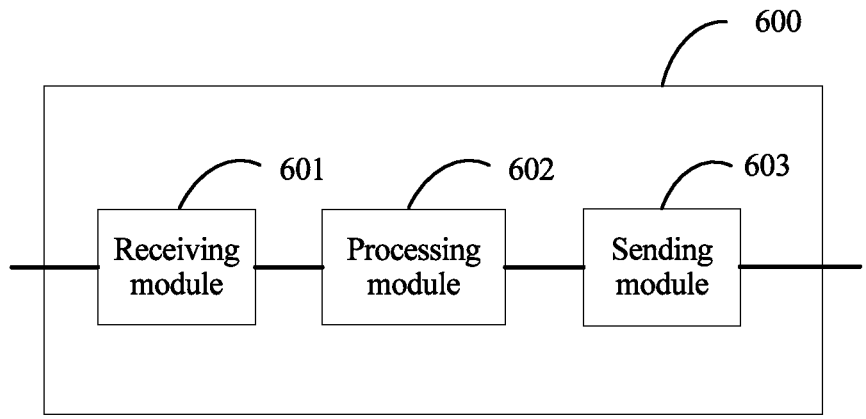
FIG. 6 is a schematic structural diagram of a base station for reporting channel state information according to an embodiment of the present invention.

As shown in FIG. 6, an embodiment of the present invention provides a base station 600 for reporting channel state information. The base station 600 includes a receiving module 601, a sending module 603, and a processing module 602. The receiving module 601 is configured to receive a first reference signal sent by user equipment. The sending module 603 is configured to send a first parameter set and a second reference signal to the user equipment, and the first parameter set is obtained by the processing module 602 by measuring the first reference signal. The receiving module 601 is further configured to receive a third parameter set sent by the user equipment. The third parameter set includes a relative value between a parameter in a second parameter set and a parameter in the first parameter set, and the second parameter set is obtained by the user equipment by measuring the second reference signal. The third parameter set and the first parameter set are used by the processing module 602 to determine a precoding matrix.

For other functions of the function modules of the base station 600, refer to the content descriptions in the foregoing related method part. Details are not described herein again.

For beneficial effects of the base station 600, refer to the content descriptions in the foregoing related method part. Details are not described herein again.

Figure 7:
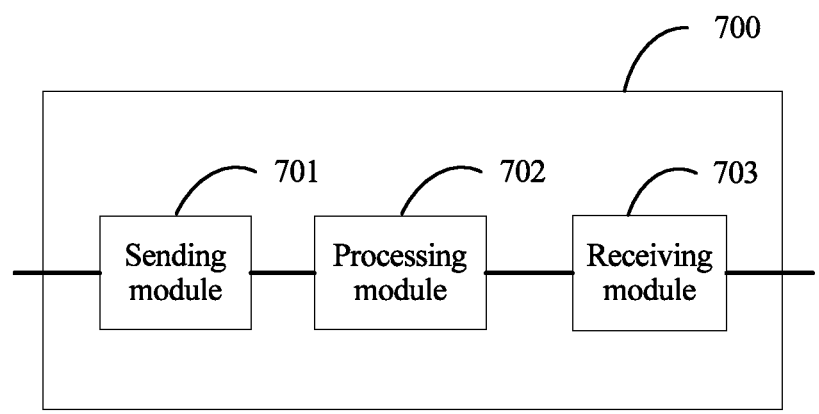
FIG. 7 is a schematic structural diagram of user equipment for reporting channel state information according to an embodiment of the present invention.

As shown in FIG. 7, an embodiment of the present invention provides user equipment 700 for reporting channel state information. The user equipment 700 includes a sending module 701, a receiving module 703, and a processing module 702. The sending module 701 is configured to send a first reference signal to a base station. The receiving module 703 is configured to receive a first parameter and a second reference signal that are sent by the base station, and the first parameter set is obtained by the base station by measuring the first reference signal. The sending module 701 is further configured to send a third parameter set to the base station. The third parameter set includes a relative value between a parameter in a second parameter set and a parameter in the first parameter set, and the second parameter set is obtained by the processing module 702 by measuring the second reference signal. The third parameter set and the first parameter set are used by the base station to determine a precoding matrix.

For other functions of the function modules of the user equipment 700, refer to the content descriptions in the foregoing related method part. Details are not described herein again.

For beneficial effects of the user equipment 700, refer to the content descriptions in the foregoing related method part. Details are not described herein again.

Figure 8:
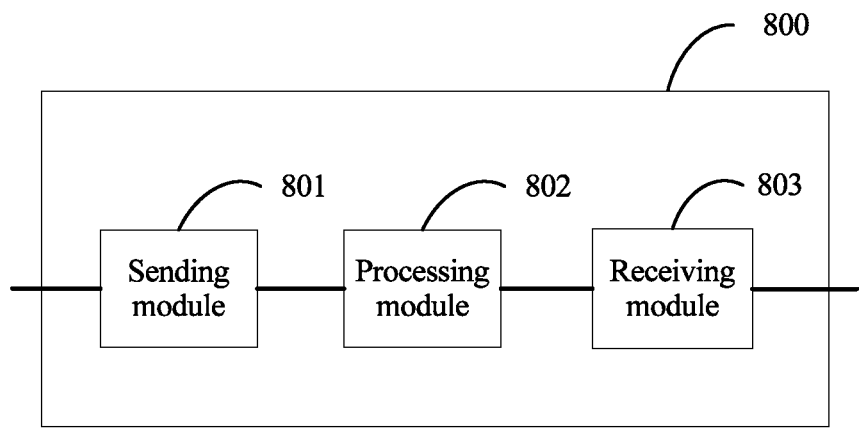
FIG. 8 is a schematic structural diagram of another base station for reporting channel state information according to an embodiment of the present invention.

As shown in FIG. 8, an embodiment of the present invention provides a base station 800 for reporting channel state information. The base station 800 includes a sending module 801, a receiving module 803, and a processing module 802. The sending module 801 is configured to send a first reference signal and at least one second reference signal to user equipment. The receiving module 803 is configured to receive a first parameter set and a third parameter set that are sent by the user equipment. The first parameter set is obtained by the user equipment by measuring the first reference signal, the third parameter set includes a relative value between a parameter in at least one second parameter set and a parameter in the first parameter set, and the at least one second parameter set is obtained by the user equipment by measuring the at least one second reference signal. The third parameter set and the first parameter set are used by the processing module 802 to determine a precoding matrix.

For other functions of the function modules of the base station 800, refer to the content descriptions in the foregoing related method part. Details are not described herein again.

For beneficial effects of the base station 800, refer to the content descriptions in the foregoing related method part. Details are not described herein again.

Figure 9:
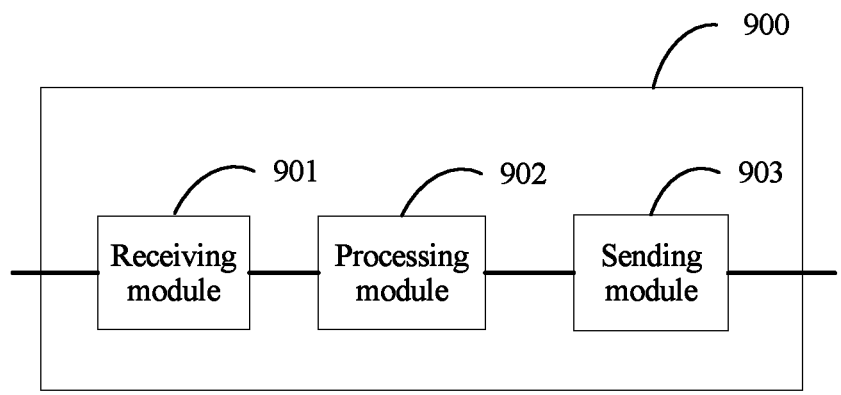
FIG. 9 is a schematic structural diagram of another user equipment for reporting channel state information according to an embodiment of the present invention.

As shown in FIG. 9, an embodiment of the present invention provides user equipment 900 for reporting channel state information. The user equipment 900 includes a receiving module 901, a sending module 903, and a processing module 902. The receiving module 901 is configured to receive a first reference signal and at least one second reference signal that are sent by a base station. The sending module 903 is configured to send a first parameter set and a third parameter set to the base station. The first parameter set is obtained by the processing module 902 by measuring the first reference signal, the third parameter set includes a relative value between a parameter in at least one second parameter set and a parameter in the first parameter set, and the at least one second parameter set is obtained by the processing module 902 by measuring the at least one second reference signal. The third parameter set and the first parameter set are used by the base station to determine a precoding matrix.

For other functions of the function modules of the user equipment 900, refer to the content descriptions in the foregoing related method part. Details are not described herein again.

For beneficial effects of the user equipment 900, refer to the content descriptions in the foregoing related method part. Details are not described herein again.

Figure 10:
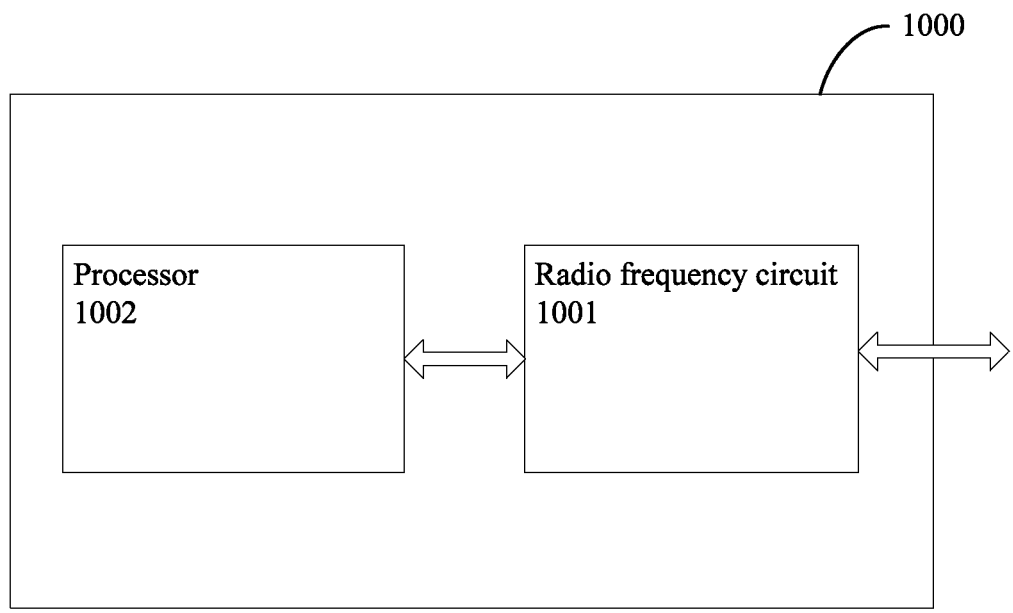
FIG. 10 is a schematic structural diagram of a base station for reporting channel state information according to an embodiment of the present invention.

As shown in FIG. 10, an embodiment of the present invention further provides a base station 1000 for reporting channel state information. The base station 1000 includes a radio frequency circuit 1001 and a processor 1002. The radio frequency circuit 1001 is configured to receive a first reference signal sent by user equipment. The radio frequency circuit 1001 is further configured to send a first parameter set and a second reference signal to the user equipment, and the first parameter set is obtained by the processor 1002 by measuring the first reference signal. The radio frequency circuit 1001 is further configured to receive a third parameter set sent by the user equipment. The third parameter set includes a relative value between a parameter in a second parameter set and a parameter in the first parameter set, and the second parameter set is obtained by the user equipment by measuring the second reference signal. The third parameter set and the first parameter set are used by the processor 1002 to determine a precoding matrix.

For other functions of the radio frequency circuit 1001 and the processor 1002, refer to the content descriptions in the foregoing related method part. Details are not described herein again.

For beneficial effects of the base station 1000, refer to the content descriptions in the foregoing related method part. Details are not described herein again.

Figure 11:
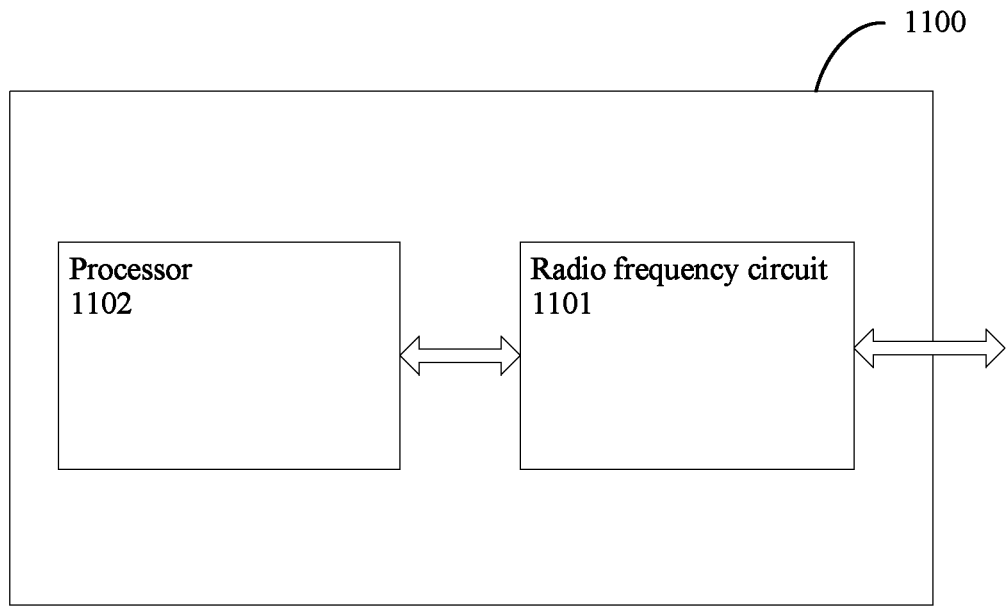
FIG. 11 is a schematic structural diagram of user equipment for reporting channel state information according to an embodiment of the present invention.

As shown in FIG. 11, an embodiment of the present invention provides user equipment 1100 for reporting channel state information. The user equipment 1100 includes a radio frequency circuit 1101 and a processor 1102. The radio frequency circuit 1101 is configured to send a first reference signal to a base station. The radio frequency circuit 1101 is further configured to receive a first parameter and a second reference signal that are sent by the base station, and the first parameter set is obtained by the base station by measuring the first reference signal. The radio frequency circuit 1101 is further configured to send a third parameter set to the base station. The third parameter set includes a relative value between a parameter in a second parameter set and a parameter in the first parameter set, and the second parameter set is obtained by the processor 1102 by measuring the second reference signal. The third parameter set and the first parameter set are used by the base station to determine a precoding matrix.

For other functions of the radio frequency circuit 1101 and the processor 1102, refer to the content descriptions in the foregoing related method part. Details are not described herein again.

For beneficial effects of the user equipment 1100, refer to the content descriptions in the foregoing related method part. Details are not described herein again.

Figure 12:
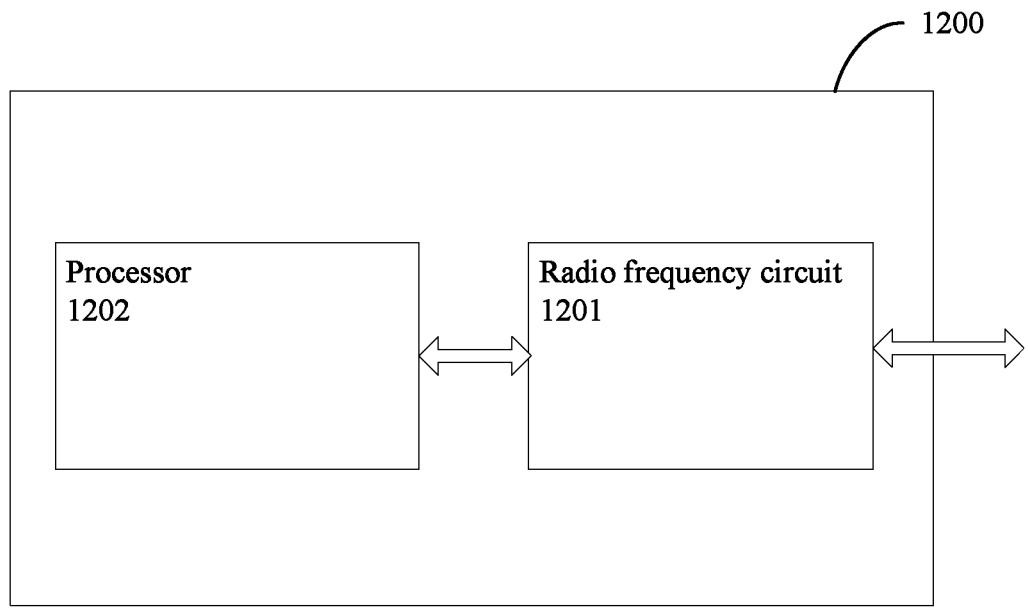
FIG. 12 is a schematic structural diagram of another base station for reporting channel state information according to an embodiment of the present invention.

As shown in FIG. 12, an embodiment of the present invention further provides a base station 1200 for reporting channel state information. The base station 1200 includes a radio frequency circuit 1201 and a processor 1202. The radio frequency circuit 1201 is configured to send a first reference signal and at least one second reference signal to user equipment. The radio frequency circuit 1201 is further configured to receive a first parameter set and a third parameter set that are sent by the user equipment. The first parameter set is obtained by the user equipment by measuring the first reference signal, the third parameter set includes a relative value between a parameter in at least one second parameter set and a parameter in the first parameter set, and the at least one second parameter set is obtained by the user equipment by measuring the at least one second reference signal. The third parameter set and the first parameter set are used by the processor 1202 to determine a precoding matrix.

For other functions of the radio frequency circuit 1201 and the processor 1202, refer to the content descriptions in the foregoing related method part. Details are not described herein again.

For beneficial effects of the base station 1200, refer to the content descriptions in the foregoing related method part. Details are not described herein again.

Figure 13:
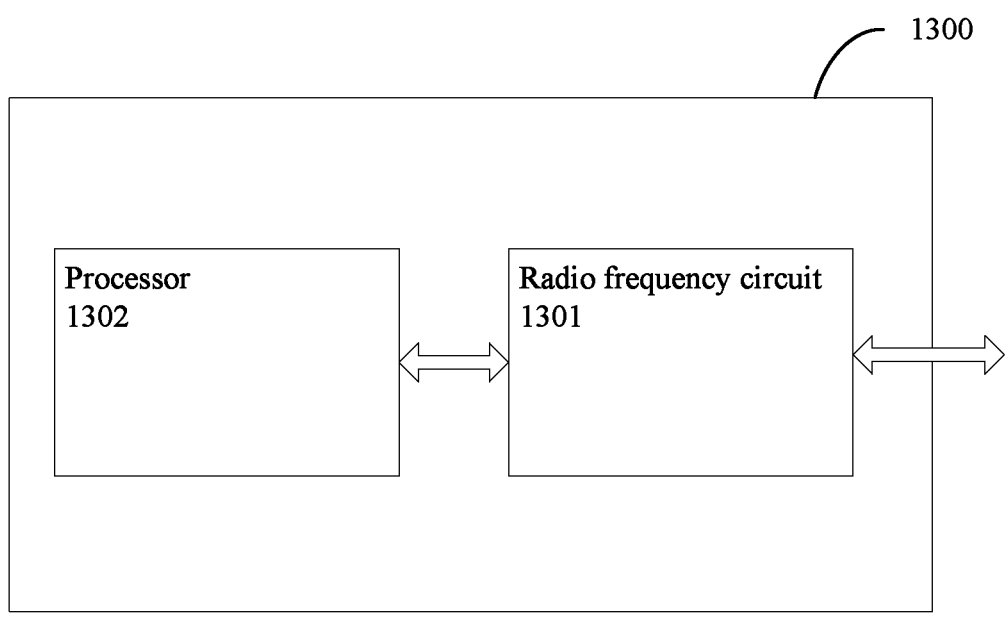
FIG. 13 is a schematic structural diagram of another user equipment for reporting channel state information according to an embodiment of the present invention.

As shown in FIG. 13, an embodiment of the present invention provides another user equipment 1300 for reporting channel state information. The user equipment 1300 includes a radio frequency circuit 1301 and a processor 1302. The radio frequency circuit 1301 is configured to receive a first reference signal and at least one second reference signal that are sent by a base station. The radio frequency circuit 1301 is further configured to send a first parameter set and a third parameter set to the base station. The first parameter set is obtained by the processor 1302 by measuring the first reference signal, the third parameter set includes a relative value between a parameter in at least one second parameter set and a parameter in the first parameter set, and the at least one second parameter set is obtained by the processor 1302 by measuring the at least one second reference signal. The third parameter set and the first parameter set are used by the base station to determine a precoding matrix.

For other functions of the radio frequency circuit 1301 and the processor 1302, refer to the content descriptions in the foregoing related method part. Details are not described herein again.

For beneficial effects of the base station 1300, refer to the content descriptions in the foregoing related method part. Details are not described herein again.

It may be understood that a processor in the embodiments of this application may be a central processing unit (Central Processing Unit, CPU), or may be another general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The general purpose processor may be a microprocessor, or may be any common processor.

The method steps in the embodiments of this application may be implemented by hardware, or may be implemented by a processor by executing a software instruction. The software instruction may include a corresponding software module. The software module may be stored in a random access memory (Random Access Memory, RAM), a flash memory, a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a base station or user equipment. Certainly, the processor and the storage medium may alternatively exist in the base station or the user equipment as discrete components.

All or some of the foregoing embodiments may be implemented by software, hardware, firmware, or any combination thereof. When being implemented by software, all or some of the embodiments may be implemented in a form of a computer program product. The computer program product includes one or more computer instructions. When the computer program instruction is loaded and executed on a computer, all or some of the procedures or functions in the embodiments of the present invention are generated. The computer may be a general-purpose computer, a dedicated computer, a computer network, or another programmable apparatus. The computer instruction may be stored in a computer readable storage medium or transmitted by using the computer readable storage medium. The computer instruction may be transmitted from one website, computer, server, or data center to another website, computer, server, or data center in a wired manner (for example, by using a coaxial cable, an optical fiber, or a digital subscriber line (DSL)) or in a wireless (for example, infrared, radio, or microwave) manner. The computer readable storage medium may be any available medium that can be accessed by a computer, or a data storage device such as a server or a data center that integrates one or more available media. The available medium may be a magnetic medium (for example, a floppy disk, a hard disk, or a magnetic tape), an optical medium (for example, a DVD), a semiconductor medium (for example, a solid state disk Solid State Disk (SSD)), or the like.

It may be understood that the various numeral references in the embodiments of this application are only used for distinction for convenient description but are not used to limit the scope of embodiments of this application.

It may be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

The foregoing descriptions are merely specific implementations of the embodiments of this application. Any variation or replacement readily figured out by a person skilled in the art within the technical scope disclosed in this application shall fall within the protection scope in the embodiments of this application.

What is claimed is:

1. A method for reporting channel state information, wherein the method comprises:

receiving, by a base station, a first reference signal sent by user equipment;

sending, by the base station, a first parameter set and a second reference signal to the user equipment, wherein the first parameter set is obtained by the base station by measuring the first reference signal; and receiving, by the base station, a third parameter set sent by the user equipment, wherein the third parameter set comprises a relative value between a parameter in a second parameter set and a parameter in the first parameter set, wherein the second parameter set is obtained by the user equipment by measuring the second reference signal, and the third parameter set and the first parameter set are used by the base station to determine a precoding matrix.

2. The method according to claim 1, wherein the first parameter set comprises parameters of uplink channels from n ports of the user equipment to the base station, and the second parameter set comprises parameters of downlink channels from the base station to m ports of the user equipment, wherein the m ports comprise the n ports, and n and m are positive integers.

3. The method according to claim 1, wherein the relative value between the parameter in the second parameter and the parameter in the first parameter comprises one or more of a difference between, a ratio between, and a sum of the parameter in the second parameter and the parameter in the first parameter.

4. The method according to claim 1, wherein the first parameter set comprises a first base vector indicator set;

the first base vector indicator set comprises at least one first base vector indicator, and the at least one first base vector indicator is used to indicate at least one first base vector in a first base vector set; and the second parameter set comprises a second base vector indicator set, the second base vector indicator set comprises at least one second base vector indicator, and the at least one second base vector indicator is used to indicate at least one second base vector in a second base vector set.

5. The method according to claim 4, wherein the third parameter set comprises a relative value between the at least one second base vector indicator and the at least one first base vector indicator.

6. A method for reporting channel state information, wherein the method comprises:

sending, by user equipment, a first reference signal to a base station;

receiving, by the user equipment, a first parameter and a second reference signal that are sent by the base station, wherein the first parameter set is obtained by the base station by measuring the first reference signal; and sending, by the user equipment, a third parameter set to the base station, wherein the third parameter set comprises a relative value between a parameter in a second parameter set and a parameter in the first parameter set, wherein the second parameter set is obtained by the user equipment by measuring the second reference signal, and the third parameter set and the first parameter set are used by the base station to determine a precoding matrix.

7. The method according to claim 6, wherein the first parameter set comprises parameters of uplink channels from n ports of the user equipment to the base station, and the second parameter set comprises parameters of downlink channels from the base station to m ports of the user equipment, wherein the m ports comprise the n ports, and n and m are positive integers.

8. The method according to claim 6, wherein the relative value between the parameter in the second parameter and the parameter in the first parameter comprises one or more of a difference between, a ratio between, and a sum of the parameter in the second parameter and the parameter in the first parameter.

9. The method according to claim 6, wherein the first parameter set comprises a first base vector indicator set, the first base vector indicator set comprises at least one first base vector indicator, and the at least one first base vector indicator is used to indicate at least one first base vector in a first base vector set; and the second parameter set comprises a second base vector indicator set, the second base vector indicator set comprises at least one second base vector indicator, and the at least one second base vector indicator is used to indicate at least one second base vector in a second base vector set.

10. The method according to claim 9, wherein the third parameter set comprises a relative value between the at least one second base vector indicator and the at least one first base vector indicator.

11. Apparatus for reporting channel state information, wherein the apparatus comprises:

a transmitter, configured to send a first reference signal to a base station;

a receiver, configured to receive a first parameter and a second reference signal that are sent by the base station, wherein the first parameter set is obtained by the base station by measuring the first reference signal; wherein the transmitter is further configured to send a third parameter set to the base station, wherein the third parameter set comprises a relative value between a parameter in a second parameter set and a parameter in the first parameter set; and a processor, wherein the second parameter set is obtained by the processor by measuring the second reference signal, and the third parameter set and the first parameter set are used by the base station to determine a precoding matrix.

12. The apparatus according to claim 11, wherein the first parameter set comprises parameters of uplink channels from n ports of the apparatus to the base station, and the second parameter set comprises parameters of downlink channels from the base station to m ports of the apparatus, wherein the m ports comprise the n ports, and n and m are positive integers.

13. The apparatus according to claim 11, wherein the relative value between the parameter in the second parameter and the parameter in the first parameter comprises one or more of a difference between, a ratio between, and a sum of the parameter in the second parameter and the parameter in the first parameter.

14. The apparatus according to claim 11, wherein the first parameter set comprises a first base vector indicator set, the first base vector indicator set comprises at least one first base vector indicator, and the at least one first base vector indicator is used to indicate at least one first base vector in a first base vector set; and the second parameter set comprises a second base vector indicator set, the second base vector indicator set comprises at least one second base vector indicator, and the at least one second base vector indicator is used to indicate at least one second base vector in a second base vector set.

15. The apparatus according to claim 14, wherein the third parameter set comprises a relative value between the at least one second base vector indicator and the at least one first base vector indicator.

16. The apparatus according to claim 14, wherein the third parameter set comprises a relative value between second base vector amplitude information and first base vector amplitude information, wherein the first base vector amplitude information is amplitude information of the at least one first base vector, the second base vector amplitude information is amplitude information of the at least one second base vector, and the second base vector amplitude information is obtained by the processor based on the second reference signal and the first parameter set.

17. The apparatus according to claim 14, wherein the third parameter set comprises a relative value between a second base vector combination coefficient phase and a first base vector combination coefficient phase, the first base vector combination coefficient phase is a combination coefficient phase of the at least one first base vector, and the second base vector combination phase is a combination coefficient phase of the at least one second base vector; and the first base vector combination coefficient phase is obtained by the processor based on the second reference signal and the first parameter set.

18. The apparatus according to claim 11, wherein the first reference signal comprises a sounding reference signal SRS.

19. The apparatus according to claim 11, wherein the second reference signal comprises a channel state information-reference signal CSI-RS.

20. The apparatus according to claim 11, that the third parameter set and the first parameter set are used by the base station to determine a precoding matrix comprises:

the third parameter set is used by the base station to correct the first parameter set, to obtain the second parameter set; and the precoding matrix is determined based on the second parameter set.

* * * * *